(12) United States Patent
Shimakawa

(10) Patent No.: US 10,654,980 B2
(45) Date of Patent: May 19, 2020

(54) SILICONE RUBBER COMPOSITION, METHOD OF PRODUCING THE SAME, AND SILICONE RUBBER EXTRUDATE

(71) Applicant: MOMENTIVE PERFORMANCE MATERIALS JAPAN LLC, Minato-ku, Tokyo (JP)

(72) Inventor: Masanari Shimakawa, Tokyo (JP)

(73) Assignee: MOMENTIVE PERFORMANCE MATERIALS JAPAN LLC, Tokyo (JP)

( * ) Notice: Subject to any disclaimer, the term of this patent is extended or adjusted under 35 U.S.C. 154(b) by 71 days.

(21) Appl. No.: 16/008,255

(22) Filed: Jun. 14, 2018

(65) Prior Publication Data

US 2018/0291160 A1 Oct. 11, 2018

Related U.S. Application Data

(63) Continuation of application No. PCT/JP2016/087577, filed on Dec. 16, 2016.

(30) Foreign Application Priority Data

Dec. 17, 2015 (JP) .................. 2015-246104

(51) Int. Cl.
| | |
|---|---|
| C08L 83/04 | (2006.01) |
| C08J 3/28 | (2006.01) |
| C08K 3/36 | (2006.01) |
| C08K 5/56 | (2006.01) |
| C08L 83/06 | (2006.01) |
| C08K 5/14 | (2006.01) |
| C08G 77/20 | (2006.01) |
| C08G 77/12 | (2006.01) |
| C08G 77/08 | (2006.01) |

(52) U.S. Cl.
CPC ........ *C08J 3/28* (2013.01); *C08K 3/36* (2013.01); *C08K 5/14* (2013.01); *C08K 5/56* (2013.01); *C08L 83/04* (2013.01); *C08L 83/06* (2013.01); *C08G 77/08* (2013.01); *C08G 77/12* (2013.01); *C08G 77/20* (2013.01); *C08J 2383/04* (2013.01)

(58) Field of Classification Search
CPC combination set(s) only.
See application file for complete search history.

(56) References Cited

U.S. PATENT DOCUMENTS

| 4,008,198 A | 2/1977 | Krohberger et al. |
| 4,785,047 A | 11/1988 | Jensen |
| 5,767,193 A | 6/1998 | Fujiki et al. |
| 6,750,279 B1 * | 6/2004 | Wang .................. C08K 5/05 524/379 |
| 8,178,207 B2 * | 5/2012 | Mizuno ................ C09J 183/04 428/447 |
| 2002/0016412 A1 | 2/2002 | Hirai et al. |
| 2004/0132890 A1 * | 7/2004 | Oka .................... C08J 9/0066 524/492 |
| 2006/0159935 A1 | 7/2006 | Mizushima et al. |
| 2014/0024730 A1 * | 1/2014 | Shimakawa ............ C08J 9/06 521/50.5 |
| 2018/0299705 A1 * | 10/2018 | Schmidt ................ G02B 1/04 |

FOREIGN PATENT DOCUMENTS

| EP | 0 305 032 | 3/1989 |
| EP | 1 160 288 | 12/2001 |
| GB | 1 489 637 A | 10/1977 |
| JP | S51-004249 A | 1/1976 |
| JP | S64-043564 A | 2/1989 |
| JP | 06-306295 A | 11/1994 |
| JP | H09-077978 A | 3/1997 |
| JP | 2001-342347 A | 12/2001 |
| JP | 2004-067961 A | 3/2004 |
| JP | 2006-225636 A | 8/2006 |
| JP | 2011-016977 A | 1/2011 |

* cited by examiner

*Primary Examiner* — Marc S Zimmer
(74) *Attorney, Agent, or Firm* — Foley & Lardner LLP

(57) ABSTRACT

There is provided a silicone rubber composition that has improved moldability, in particular, extrusion moldability, while ensuring that a cured product obtained therefrom has sufficient strength. The silicone rubber composition contains: (A) a 100 part by mass base polymer consisting of (A1) a polyorganosiloxane diol whose viscosity at 25° C. is 1 to 100 Pas and (A2) a polyorganosiloxane whose viscosity at 25° C. is 0.2 to 40000 Pas, with a ratio of (A1) being 20 to 100% by mass to the whole (A), the base polymer having a viscosity of 5 to 20000 Pas at 25° C. and having an alkenyl group content of 0.001 to 0.3 mmol/g; (B) a 10 to 50 part by mass silica powder whose specific surface area is 50 to 400 $m^2/g$; (C) a 1 to 10 part by mass organosilazane; and (D) a catalytic amount of a curing agent.

23 Claims, 2 Drawing Sheets

SILICONE RUBBER COMPOSITION, METHOD OF PRODUCING THE SAME, AND SILICONE RUBBER EXTRUDATE

CROSS-REFERENCE TO RELATED APPLICATIONS

This application is a continuation of prior International Application No. PCT/JP2016/087577 filed on Dec. 16, 2016 which is based upon and claims the benefit of priority from Japanese Patent Application No. 2015-246104 filed on Dec. 17, 2015; the entire contents of all of which are incorporated herein by reference.

TECHNICAL FIELD

The present invention relates to a silicone rubber composition, a method of producing the same, and a silicone rubber extrudate of the same, in particular, to a millable silicone rubber composition, a method of producing the same, and a silicone rubber extrudate of the same.

BACKGROUND

Silicone rubbers are used in a wide variety of fields including electric equipment, automobile, construction, medical care, and food fields because of their excellent properties such as weather resistance, electric properties, a low compression set property, and heat resistance. Among silicone rubbers, a millable silicone rubber is widely used for producing rubber components because it can be mixed with a coloring agent and so on by a simple device such as a twin roll and can be molded by simple equipment such as a press, and especially because its shape can be retained even in an uncured state, it is widely used in extrusion molding of tubes, gaskets, and the like.

However, the unique tackiness that the surface of a cured silicone rubber has is likely to cause a problem of blocking of surfaces of its molded products. Forming minute irregularities on the surfaces can prevent the blocking, and in molded products formed using a mold, the blocking can be easily prevented by roughening the surface of the mold. However, in extrusion molding and coating which do not use a mold, it is difficult to control the surface state, and an improvement has been desired.

In the usage in the coating not using a mold, as an attempt to solve the blocking problem, Patent Reference 1 (JP-A No. 2006-225636), for example, describes a liquid silicone rubber coating agent composition in which gel-type silica having a 0.5 to 20 average particle size is used as a filler. However, even if the technique of this coating agent composition is applied to a composition for a silicone rubber molded product having an appropriate thickness as is produced by extrusion molding, the filler with a specific particle size compounded for preventing the blocking is not easily exposed to the surface, making it difficult to effectively solve the blocking problem. Further, in order to prevent the blocking by this method, an excessive amount of the filler needs to be compounded, which has a disadvantage that the silicone rubber loses its flexibility.

Further, a base compound of a conventional millable silicone rubber is produced by mixing a filler into a high-polymerization degree polyorganosiloxane in a crude rubber state, and it is a typical practice to compound low-viscosity disilanol or the like as process oil in order to facilitate the compounding of the filler.

Further, the aforesaid high-polymerization degree polyorganosiloxane in the crude rubber state is typically produced through ring-opening polymerization of low-molecular cyclic siloxane by an alkaline catalyst, but this reaction is an equilibration reaction, and a certain amount of the unreacted low molecular siloxane remains in the polymer. In recent years, there has been a demand for a reduction of the low molecular siloxane, but a difficulty in removing the low molecular siloxane from the base polymer in the crude rubber state necessitates high-temperature post-curing of a cured molded product, and inevitably causes a cost increase. Moreover, the high-temperature post-curing narrows a material selection width especially at the time of composite molding with a thermally vulnerable material such as thermoplastic resin.

To solve such problems, Patent Reference 2 (JP-A No. 2011-16977), for example, describes a silicone rubber composition in which the content of a low-molecular siloxane with a 10 or less degree of polymerization in a polyorganosiloxane compounded in a base compound is reduced in order to prevent a contact fault of electronic components. However, in the medical care application and health care application, a reduction of all volatile siloxanes in addition to the low molecular siloxane with a 10 or less degree of polymerization has recently been required, and there is a need for a further improvement.

CITATION LIST

SUMMARY

The present invention is made from the above-described viewpoints, and its object is to provide a silicone rubber composition that has improved moldability, in particular, extrusion moldability, while ensuring that a cured product obtained therefrom has sufficient strength, a method of producing the same, and a silicone rubber extrudate having blocking resistance. Here, in this specification, a molded product of the silicone rubber composition means a cured product obtained by molding and curing the silicone rubber composition. Further, when simple "silicone rubber" is mentioned, it means a cured product of the silicone rubber composition.

A silicone rubber composition of the present invention contains:

(A) a 100 part by mass base polymer consisting of the following (A1) and (A2), with a ratio of the (A1) being 20 to 100% by mass to the whole (A), the base polymer having a viscosity of 5 to 20000 Pas at 25° C. and having an alkenyl group content of 0.001 to 0.3 mmol/g, (A1) a polyorganosiloxane diol represented by the following formula (1), whose viscosity at 25° C. is 1 to 100 Pas $$\text{HO}[(R^1{}_2)\text{SiO}]_{n1}[R^1R^2\text{SiO}]_{n2}\text{H} \qquad (1)$$

where in the formula (1), each $R^1$ independently represents a monovalent unsubstituted or substituted hydrocarbon group not containing an alkenyl group, and $R^2$ represents an alkenyl group, and in the formula (1), n1 and n2 each represent the total number of randomly polymerized or block-polymerized repeating units, n1 being an integer of 200 to 1200 and n2 being an integer of 0 to 30, and (A2) a polyorganosiloxane represented by the following average composition formula (2), whose viscosity at 25° C. is 0.2 to 40000 Pas $$R^3{}_a\text{SiO}_{(4-a)/2} \qquad (2)$$

where in the formula (2), each $R^3$ independently represents a monovalent unsubstituted or substituted, saturated or unsaturated hydrocarbon group not containing a hydroxy group, and "a" represents a number in a range of 1.98 to 2.02;

(B) a 10 to 50 part by mass silica powder whose specific surface area is 50 to 400 m²/g;

(C) a 1 to 10 part by mass organosilazane; and (D) a catalytic amount of a curing agent.

The silicone rubber composition of the present invention having the above composition is a silicone rubber composition having improved moldability, in particular, extrusion moldability, while ensuring that a cured product obtained therefrom has sufficient strength. According to the silicone rubber composition of the present invention, by, for example, extrusion-molding and curing the composition, it is possible to obtain an extrudate that is excellent in surface blocking resistance without being post-processed.

In the silicone rubber composition of the present invention, when the composition is extruded at a rate of 2 m per minute by a screw extruder and thereafter cured into a tubular cured product, the tubular cured product preferably has, on a surface, 1 to 300 pieces/0.01 mm² granular protrusions whose maximum diameter measured in a scanning electron microscopic image is 0.1 to 30 μm.

In the silicone rubber composition of the present invention, it is preferable that the ratio of the component (A1) to the whole component (A) is 50 to 100% by mass, and the viscosity of the component (A) at 25° C. is 5 to 3000 Pas.

In the silicone rubber composition of the present invention, it is also preferable that the ratio of the component (A1) to the whole component (A) is 40 to 100% by mass, and the viscosity of the component (A) at 25° C. is 5 to 1000 Pas. Hereinafter, the component (A) in which the ratio of the component (A1) to the whole component (A) is 40 to 100% by mass and whose viscosity at 25° C. is 5 to 1000 Pas will be referred as a "low viscosity component (A)", and the silicone rubber composition of the present invention in which the component (A) is the low viscosity component (A) will be referred to as a "low viscosity component (A)-containing silicone rubber composition".

Such a low viscosity component (A)-containing silicone rubber composition allows the easy removal of a low molecular siloxane from a raw material, which consequently makes it possible to produce a cured product that has a fully reduced low molecular siloxane content without being post-cured.

It is preferable that, in the silicone rubber composition of the present invention, a mass reduction rate of the component (A) in before and after normal-pressure, 200° C., four-hour heat treatment is 1.0% or less, and the silicone rubber composition is a silicone rubber composition that gives a cured product that has a mass reduction rate of 0.5% or less in before and after the normal-pressure, 200° C., four-hour heat treatment without being post-cured. The low viscosity component (A)-containing silicone rubber composition is usable as a silicone rubber composition that gives such a cured product whose mass reduction rate is small.

The present invention provides a method of producing a silicone rubber molded product, the method including molding the low viscosity component (A)-containing silicone rubber composition or the silicone rubber composition of the present invention in which the mass reduction rate of the component (A) in before and after the normal-pressure, 200° C., four-hour heat treatment is 1.0% or less and curing the molded silicone rubber composition by heat or UV irradiation, thereby capable of producing a silicone rubber molded product whose mass reduction rate in before and after normal-pressure, 200° C., four-hour heat treatment is 0.5% or less without performing post-curing.

Further, the present invention provides a method of producing the silicone rubber composition of the present invention, the method including the steps of: adding the component (B), and the component (C) to the component (A) in parts a plurality of times or continuously at a predetermined rate; and thereafter adding the component (D).

A silicone rubber extrudate of the present invention is an extrudate obtained using the silicone rubber composition of the present invention, and has, on a surface, granular protrusions whose maximum diameter measured in a scanning electron microscopic (SEM) image is 0.1 to 30 μm.

According to the present invention, it is possible to provide a silicone rubber composition having improved moldability, in particular, extrusion moldability, while ensuring that a cured product obtained therefrom has sufficient strength. According to the silicone rubber composition of the present invention, since the surface of its extrudate is excellent in slip property, it is possible to prevent blocking. A possible reason for this improvement in the surface slip property may be that spherical bodies resulting from the aggregation of silica particles are exposed to the surface.

DETAILED DESCRIPTION

Figure 1A:
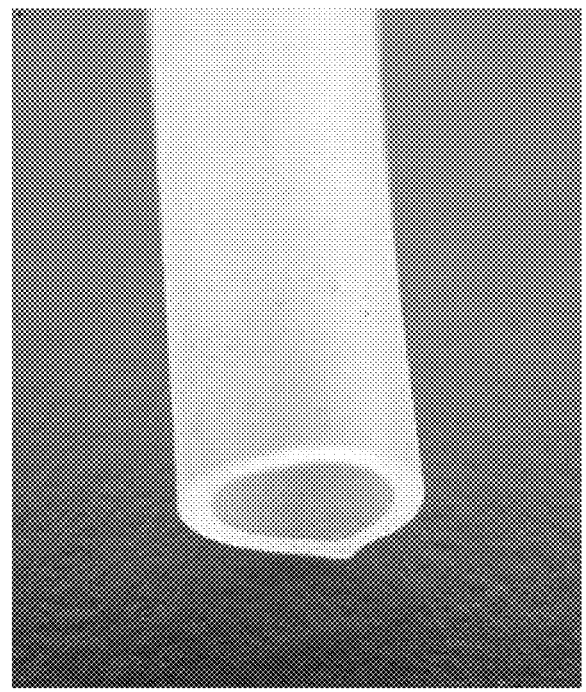
FIG. 1A is a SEM photograph (×1) of a surface of a silicone rubber extrudate obtained in Example 12.

An embodiment of the present invention will be hereinafter described.

[Silicone Rubber Composition]

The silicone rubber composition of the present invention contains the predetermined amounts of the components (A), (B), (C), and (D). These components will be described below.

(Component (A))

The component (A) is a base polymer that contains a specific polyorganosiloxane diol, has a predetermined amount of an alkenyl group, has a predetermined viscosity, and forms a millable silicone rubber composition when mixed with the component (B), the component (C), and the component (D).

The component (A) consists of the following component (A1) and component (A2), with a ratio of the component (A1) being 20 to 100% by mass to the whole component (A). The component (A) has an alkenyl group content of 0.001 to 0.3 mmol/g, and has a viscosity of 5 to 20000 Pas at 25° C. That is, in obtaining the component (A), when the following component (A1) and component (A2) are mixed such that the ratio of the component (A1) becomes the ratio of 20 to 100% mass to the whole component (A), they are mixed such that the alkenyl group content of the whole component (A) becomes 0.001 to 0.3 mmol/g and its viscosity at 25° C. becomes 5 to 20000 Pas. In this specification, "viscosity" refers to a viscosity measured at 25° C. at a 0.1 s$^{-1}$ shear rate unless otherwise specified.

The component (A1) is a polyorganosiloxane diol represented by the following formula (1), whose viscosity at 25° C. is 1 to 100 Pas. Hereinafter, the polyorganosiloxane diol represented by the following formula (1) will also be referred to as a polyorganosiloxane diol (1).

$$\mathrm{HO}[(R^1{}_2)\mathrm{SiO}]_{n1}[R^1R^2\mathrm{SiO}]_{n2}\mathrm{H} \qquad (1)$$

In the formula (1), each $R^1$ independently represents a monovalent unsubstituted or substituted hydrocarbon group not containing an alkenyl group, and $R^2$ represents an alkenyl group. n1 and n2 in the formula (1) each represent the total number of randomly polymerized or block-polymerized repeating units, n1 being an integer of 200 to 1200 and n2 being an integer of 0 to 30.

It should be noted that the above formula (1) does not necessarily represent a block copolymer. Specifically, n1 and n2 respectively representing the numbers of polymer units —$(R^1{}_2)\mathrm{SiO}$— and —$R'R^2\mathrm{SiO}$— each do not represent the number in a block, but represent the total number of the units present in the whole molecule. That is, the polyorganosiloxane diol represented by the formula (1) may be a random copolymer. A siloxane skeleton of the polyorganosiloxane diol (1) is substantially linear because this enables the synthesis of a high-polymerization degree polymer having the predetermined viscosity with good controllability, and it may have some branches, for example, a plurality of branches may be present in its molecule.

The component (A1) may consist of one kind of the polyorganosiloxane diol (1), or may consist of two kinds or more thereof. In a case where it consists of one kind of the polyorganosiloxane diol (1), the viscosity of the polyorganosiloxane diol (1) is 1 to 100 Pas. In a case where it consists of two kinds or more of the polyorganosiloxane diols, the viscosity of each of the polyorganosiloxane diols (1) does not necessarily fall within the aforesaid range, provided that the viscosity of the component (A1) obtained by mixing these falls within the aforesaid range, but preferably, in each of the polyorganosiloxane diols (1), the viscosity is 1 to 100 Pas.

When the viscosity of the component (A1) is 1 to 100 Pas, the viscosity of the component (A) can be adjusted to 5 to 20000 Pas, which is its predetermined viscosity, when the component (A1) is compounded with the component (A2) at a predetermined ratio. The viscosity of the polyorganosiloxane diol (1) is preferably 5 to 100 Pas, and more preferably 5 to 50 Pas.

An average degree of polymerization of the polyorganosiloxane diol (1), that is, an average number of the siloxane units in the polyorganosiloxane diol (1) molecule is indicated by the total number (n1+n2) of n1 and n2 in the formula (1). The average degree of polymerization of the polyorganosiloxane diol (1) is not limited, provided that its viscosity falls within the aforesaid range. In the polyorganosiloxane diol (1) whose viscosity falls within the range of 1 to 100 Pas, its average degree of polymerization is roughly about 200 to 1200.

It is optional whether the polyorganosiloxane diol (1) has, in its molecule, $R^2$ being the alkenyl group. In a case where the component (A) consists of only the component (A1), an alkenyl group content of the component (A1) is 0.001 to 0.3 mmol/g, and at least one kind of the polyorganosiloxane diol (1) forming the component (A1) has $R^2$ being the alkenyl group. In a case where the component (A) consists of only the component (A1) and the component (A1) consists of only one kind of the polyorganosiloxane diol (1), the alkenyl group content of the polyorganosiloxane diol (1) is 0.001 to 0.3 mmol/g. In this case, the alkenyl group content of the polyorganosiloxane diol (1) is preferably 0.01 to 0.3 mmol/g, and more preferably 0.05 to 0.2 mmol/g.

That the polyorganosiloxane diol (1) has the alkenyl group in its molecule means that the formula (1) has the polymer unit —$R^1R^2\mathrm{SiO}$— and n2 representing the number of the polymer units is one or more. The number represented by n2 depends on the alkenyl group content of the polyorganosiloxane diol (1). Incidentally, the alkenyl group that the polyorganosiloxane diol (1) has does not exist in a terminal $O_{1/2}$—SiOH unit but exists while bonding with a silicon atom in an intermediate Si—$O_{2/2}$ unit.

Specific examples of the alkenyl group represented by $R^2$ in the formula (1) include a vinyl group, an allyl group, a 3-butenyl group, a 4-pentenyl group, and a 5-hexenyl group. $R^2$ is preferably a vinyl group because this facilitates synthesizing and handling of the polyorganosiloxane diol (1) and it is easy to undergo an addition reaction. In a case where $R^2$ exists in plurality in the formula (1), the plural $R^2$s may be identical or may be different, but are preferably identical in view of easy synthesis.

In the formula (1), $R^1$s are each independently a monovalent unsubstituted or substituted hydrocarbon group not containing an alkenyl group. Specific examples of $R^1$ include alkyl groups such as a methyl group, an ethyl group, a propyl group, a butyl group, a pentyl group, and a hexyl group; aryl groups such as a phenyl group, a xenyl group, a naphthyl group, a tolyl group, and a xylyl group; aralkyl groups such as a benzyl group and a phenethyl group; cycloalkyl groups such as a cyclohexyl group; cycloalkenyl groups such as a cyclohexenyl group; and substituted hydrocarbon groups such as a chloromethyl group, a 3-chloropropyl group, a 3,3,3-trifluoropropyl group, a 3-cyanopropyl group, and a 3-methoxypropyl group. In the formula (1), plural $R^1$s may be identical or may be different. From the viewpoint of ease synthesis, $R^1$s are preferably identical, and a different group may be introduced to part thereof depending on physical properties required of an obtained silicone rubber.

50% or more of $R^1$s is preferably a methyl group, and particularly preferably all the $R^1$s are methyl groups because this facilitates synthesizing and handling of the polyorganosiloxane diol (1) and enables to obtain excellent heat resistance.

Further, for the purpose of imparting oil resistance and/or solvent resistance to the obtained silicone rubber, usable is a combination in which some of $R^1$s are 3,3,3-trifluoropropyl groups and the other $R^1$s are all methyl groups. In this case, a preferable combination is a combination in which some of $R^1$s in the unit in the bracket with n1 in the formula (1) are 3,3,3-trifluoropropyl groups and the other $R^1$s are all methyl groups.

In a case where the component (A) contains the component (A2) having an alkenyl group and the component (A2) alone can achieve the aforesaid alkenyl group content of the component (A), the polyorganosiloxane diol (1) need not have the alkenyl group. In this case, the polyorganosiloxane diol (1) is a compound represented by $\mathrm{HO}[(R^1{}_2)\mathrm{SiO}]_{n1}\mathrm{H}$ without the —$R^1R^2\mathrm{SiO}$— unit. Hereinafter, the polyorganosiloxane diol (1) having the alkenyl group will be referred to as a polyorganosiloxane diol (11), and the polyorganosiloxane diol (1) not having the alkenyl group will be referred to as a polyorganosiloxane diol (12).

The component (A1) may constitute the component (A) solely by the component (A1), or may be combined with the component (A2) to constitute the component (A). In a case where the component (A) consists of only the component (A1), the component (A1) contains the polyorganosiloxane diol (11) as an essential component. In a case where the component (A) contains the component (A2), the component (A1) consists of one or more selected from the polyorganosiloxane diol (11) and the polyorganosiloxane diol (12), and by adjusting a combination of kinds and compounding amounts of the component (A1) and the component (A2) which is contained together, the viscosity and the alkenyl group content of the component (A) are adjusted.

The component (A2) is a polyorganosiloxane represented by the following average composition formula (2), whose viscosity at 25° C. is 0.2 to 40000 Pas. Hereinafter, the polyorganosiloxane represented by formula (2) will be also referred to as a polyorganosiloxane (2).

$$R^3{}_a SiO_{(4-a)/2} \qquad (2)$$

In the formula (2), each $R^3$ independently represents a monovalent unsubstituted or substituted, saturated or unsaturated hydrocarbon group not containing a hydroxy group, and "a" represents a number in a range of 1.98 to 2.02.

Preferably, the polyorganosiloxane (2) is mainly a linear polymer which may partly form a branched-chain or three-dimensional structure. Further, the polyorganosiloxane (2) may be a homopolymer or a copolymer. Specific examples of $R^3$ in the formula (2) include the unsubstituted or substituted hydrocarbon groups exemplified as $R^1$ in the above and the alkenyl groups exemplified as $R^2$ in the above. $R^3$s in the formula (2) each independently represent the above monovalent group, and not all of $R^3$s are alkenyl groups. A preferred form of $R^3$ is also the same as the preferred form of the unsubstituted or substituted hydrocarbon group in $R^1$ or the preferred form of the alkenyl group in $R^2$.

The polyorganosiloxane (2) may be a compound in which $R^3$s have no alkenyl group, or may be a compound in which $R^3$s are partly an alkenyl group. Hereinafter, the polyorganosiloxane (2) having the alkenyl group is referred to as a polyorganosiloxane (21), and the polyorganosiloxane (2) having no alkenyl group is referred to as a polyorganosiloxane (22). The component (A2) may consist of one kind of the polyorganosiloxane (2) or may consist of two or more kinds thereof.

In a case where the component (A2) consists of one kind of the polyorganosiloxane (2), the viscosity of the polyorganosiloxane (2) is 0.2 to 40000 Pas. In a case where it consists of two or more kinds of the polyorganosiloxane (2), the viscosity of each of the polyorganosiloxanes (2) does not necessarily have to be within the above range, provided that the viscosity of the component (A2) obtained by mixing these is within the above range, but preferably the viscosity of each of the polyorganosiloxanes (2) is 0.2 to 40000 Pas.

When the viscosity of the component (A2) is 0.2 to 40000 Pas, it is possible to adjust the viscosity of the component (A) to 5 to 20000 Pas, which is its predetermined viscosity, when the component (A2) is mixed with the component (A1) at the predetermined ratio. The viscosity of the polyorganosiloxane (2) is preferably 0.4 to 40000 Pas.

An average degree of polymerization of the polyorganosiloxane (2) is not limited, provided that its viscosity is within the above range. In the polyorganosiloxane (2) whose viscosity is in the range of 0.2 to 40000 Pas, the average degree of polymerization is roughly about 100 to 7100.

It is optional whether the component (A) contains the component (A2) or not. In a case where the component (A) contains the component (A2), one or more kinds are appropriately selected as (A2) from the polyorganosiloxane (21) containing the alkenyl group and the polyorganosiloxane (22) containing no alkenyl group according to the component (A1) to be combined. In a case where the component (A) contains the component (A2), the component (A1) is preferably the polyorganosiloxane diol (12), and the component (A2) is preferably the polyorganosiloxane (21).

The polyorganosiloxane (21) is preferably, for example, a linear polymer represented by the following formula (2A) (hereinafter also referred to as a polyorganosiloxane (2A)).

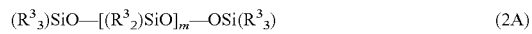

$$(R^3{}_3)SiO\text{—}[(R^3{}_2)SiO]_m\text{—}OSi(R^3{}_3) \qquad (2A)$$

In the formula (2A), $R^3$s are the same as those in the formula (2), and part thereof is the alkenyl group. In the formula (2A), "m" represents a number corresponding to the average degree of polymerization—2.

The alkenyl group content in the polyorganosiloxane (2A) is preferably 0.001 to 0.3 mmol/g, more preferably 0.003 to 0.03 mmol/g, and still more preferably 0.003 to 0.25 mmol/g, though depending on the kind and compounding amount of the polyorganosiloxane diol (1) used in combination.

The alkenyl groups in the polyorganosiloxane (2A) may be bonded with any silicon atoms in the molecule, but part thereof is preferably bonded with a silicon atom at the molecular end since this exhibits excellent reactivity. That is, part of $R^3$s in a terminal M unit represented by —OSi($R^3{}_3$) is preferably the alkenyl group, and the polyorganosiloxane (2A) is preferably a both ends alkenyl group-terminated polyorganosiloxane (2A), in which one $R^3$ in each of the M units at both ends is the alkenyl group. In the both ends alkenyl group-terminated polyorganosiloxane (2A), $R^3$s in the intermediate units —[($R^3{}_2$)SiO]— may be partly the alkenyl group. The alkenyl group is preferably a vinyl group because this facilitates synthesizing and handling of the polyorganosiloxane (2A) and it easily undergoes an addition reaction as described above.

In the both ends alkenyl group-terminated polyorganosiloxane (2A), that has the alkenyl groups in the intermediate units, up to about 2.3% of the m pieces of the intermediate units can be an intermediate unit in which one of the two $R^3$s is the alkenyl group. The intermediate units having the alkenyl groups are contained in the both ends alkenyl group-terminated polyorganosiloxane (2A), at random or in blocks.

As for groups other than the alkenyl groups in the polyorganosiloxane (2A), 50% or more of $R^3$s except the alkenyl groups is preferably a methyl group because this facilitates synthesizing and handling of the polyorganosiloxane (2A) and enables to obtain excellent heat resistance, and it is especially preferable that the other groups are all methyl groups. Especially when heat resistance, cold resistance, or radiation resistance is required, a phenyl group is appropriately usable, and when oil resistance and/or solvent resistance is required, a 3,3,3-trifluoropyropyl group or the like is appropriately usable.

The component (A) consists of the component (A1) and the component (A2) described above, and the ratio of the component (A1) is 20 to 100% by mass to the whole component (A). In addition, the alkenyl group content of the component (A) is 0.001 to 0.3 mmol/g and its viscosity at 25° C. is 5 to 20000 Pas. The alkenyl group content and the viscosity in the component (A) are adjusted by adjusting the kinds and compounding ratio of the component (A1) and the component (A2).

With the component (A) having the aforesaid predetermined compounding ratio of the component (A1) and the component (A2), predetermined alkenyl group content, and predetermined viscosity, when it is combined with the component (B), the component (C), and the component (D), which will be described below, at a predetermined ratio to form the silicone rubber composition, the silicone rubber composition can have improved moldability, in particular, extrusion moldability, while ensuring that a cured product obtained therefrom has sufficient strength. According to the silicone rubber composition obtained using such a component (A), by extrusion-molding and curing the composition, it is possible to obtain an extrudate that has excellent blocking resistance on the surface without being post-processed.

The viscosity of the component (A) is 5 to 20000 Pas, and the ratio of the component (A1) to the whole component (A) giving this viscosity is 20 to 100% by mass. When the viscosity of the component (A) is less than 5 Pas, the tackiness of the obtained silicone rubber composition becomes excessively large, deteriorating roll operability, and when the viscosity exceeds 20000 Pas, the viscosity of the silicone rubber composition becomes too high, making kneading difficult.

The viscosity of the component (A) is preferably 5 to 15000 Pas, and more preferably 5 to 3000 Pas, particularly for the purpose of improving blocking resistance in the extrudate. The viscosity of the component (A) can be adjusted by, for example, the compounding ratio of the component (A1) and the component (A2) in the component (A). The ratio of the component (A1) to the whole component (A) for obtaining the above viscosity is preferably 30 to 100% by mass, and more preferably 50 to 100% by mass.

By lowering the viscosity of the component (A), it is possible to easily remove the low molecular siloxane from the raw material, and accordingly, in order for the silicone rubber composition to be capable of giving the cured product that has a sufficiently reduced low molecular siloxane content without being post-cured, the viscosity of the component (A) is preferably 5 to 1000 Pas, more preferably 5 to 500 Pas, and still more preferably 5 to 150 Pas. The ratio of the component (A1) to the whole component (A) for obtaining such a viscosity is preferably 40 to 100% by mass, and more preferably 50 to 100% by mass.

The alkenyl group content in the component (A) is preferably 0.002 to 0.3 mmol/g, and more preferably 0.003 to 0.25 mmol/g. If the alkenyl group content of the component (A) is less than 0.001 mmol/g, the strength of the obtained cured product is not sufficient, and when it exceeds 0.3 mmol/g, the obtained cured product becomes brittle.

The content of the OH groups bonded with the silicon atoms in the component (A), that is, the content of silanol groups (Si—OH groups) is preferably 0.005 to 0.1 mmol/g, more preferably 0.005 to 0.08 mmol/g, and still more preferably 0.01 to 0.07 mmol/g.

The silanol groups of the component (A) act not only to restrain the plasticization of the silicone composition due to the component (B) by undergoing a condensation reaction with silanol groups present on the surface of the silica powder being the component (B), but also to impart an appropriate viscosity to the silicone rubber composition, and further combine the components (B) during kneading or extrusion molding to form fine spherical aggregates to reduce surface tackiness owing to the partial exposure of the spherical aggregates to the surface of the extrudate.

When the silanol group content in the component (A) is within the above range, the silicone rubber composition does not become sticky, so that roll operability is not worsened and the cured product does not deteriorate in mechanical properties, and the silanol groups can undergo a sufficient condensation reaction with the silanol groups present on the surface of the silica powder of the component (B).

In the silicone rubber composition of the present invention, the state in which the spherical aggregates are exposed to the surface of the extrudate can be evaluated by, for example, the following method.

The silicone rubber composition of the present invention is extruded at a rate of 2 m/minute by a screw extruder and then cured into a tubular cured product. A method of the curing depends on a kind of the component (D). In a case where the component (D) is an ultraviolet curable curing agent, ultraviolet rays at 365 nm with a cumulative dose of about 6000 mJ/cm$^2$ are irradiated by an ultraviolet lamp, for instance. In a case where the component (D) is of a thermosetting type, the curing is carried out at 200° C. for five minutes, for instance. In a SEM image of the surface of the obtained tubular cured product, the above spherical aggregates are observed as granular protrusions which are part or the whole, of the spherical aggregates, exposed from the surface which is flat as a whole, as shown in, for example, FIG. 1C (SEM photograph (×5000) of the surface of a tubular cured product of a silicone rubber composition of Example 12).

Out of the granular protrusions thus observed in the SEM image, the number of granular protrusions having a maximum diameter of 0.1 to 30 μm per 100 μm×100 μm (0.01 mm$^2$) area is counted. The number of the granular protrusions with the maximum diameter of 0.1 to 30 μm that the tubular cured product obtained as above using the silicone rubber composition of the present invention has on its surface is preferably 1 to 300 pieces/0.01 mm$^2$, and more preferably 10 to 200 pieces/0.01 mm$^2$.

It should be noted that a position where the granular protrusions are observed on the surface of the tubular cured product is not limited. It suffices if the granular protrusions having the maximum diameter of 0.1 to 30 μm are observed in the SEM image of any one position on the surface of the tubular cured product, and the number thereof measured per 0.01 mm$^2$ is preferably 1 to 300 pieces, and more preferably 10 to 200 pieces.

The average degrees of polymerization of the component (A1) and the component (A2) contained in the component (A) are as described above, and in the component (A), the content of the low molecular siloxane that can be volatilized at 200° C. under normal pressures is preferably sufficiently low. In the present specification, the low molecular siloxane refers to siloxane that can be volatilized at 200° C. under the normal pressures.

When the component (A) is the low viscosity component (A), the content of the low molecular siloxane contained in the low viscosity component (A) can be easily reduced by an existing method, and the content of the low molecular siloxane in the silicone rubber composition containing the low viscosity component (A) can be sufficiently low. As a result, the cured product obtained using the low viscosity component (A)-containing silicone rubber composition can be a cured product that can be used as a product without being post-cured.

As an index indicating the content of the low molecular siloxane in the component (A), a mass reduction rate [%] in before and after normal-pressure, 200° C., four-hour heat treatment can be used, for instance. Hereinafter, the mass reduction rate [%] refers to a mass reduction rate [%] in before and after the normal-pressure, 200° C., four-hour heat treatment unless otherwise specified. In the component (A), the mass reduction rate [%] is preferably 1.0% or less, and when the mass reduction rate [%] is 1.0% or less, it can be said that the content of the low molecular siloxane is low enough for the cured product to be a product without being post-cured. When the component (A) is the low viscosity component (A), the mass reduction rate [%] of 1.0% or less can be easily attained. The mass reduction rate [%] of the component (A) is more preferably 0.8% or less, and still more preferably 0.6% or less.

The silicone rubber composition of the present invention is preferably a silicone rubber composition that gives a cured product that can be a product without being post-cured. Here, that the cured product can be the product without being post-cured refers to a case where a mass reduction rate [%] of the cured product is approximately 0.5% or less. A curing condition for obtaining the cured product which is to be subjected to a mass reduction rate [%] test, from the silicone rubber composition is a thermal curing condition or a UV curing condition, which will be described later, depending on the kind of the component (D), for instance.

The siloxane polymer such as the component (A1) and the component (A2) constituting the component (A) is usually produced through an equilibrium reaction of a siloxane oligomer with an acid, an alkali, or the like. Therefore, in the siloxane polymer having the aforesaid average degree of polymerization, a considerable amount of the low molecular siloxane is also present.

Therefore, in the present invention, it is preferable to use the component (A) from which such low molecular siloxane has been removed until the mass reduction rate [%] falls within the above range. The low molecular siloxane is removed from the component (A) after the component (A1) and the component (A2) are mixed, or from the component (A1) and the component (A2) before they are mixed. Preferably, it is removed from the component (A1) and the component (A2) before they are mixed.

Examples of a method for reducing the low molecular siloxane component contained in the siloxane polymer include conventionally known methods such as a method of vaporizing and removing the low molecular siloxane component in a reduced pressure state under high-temperature heating at about 100 to 300° C., and a method of further promoting the vaporization by blowing an inert gas during the above vaporization removal or after the vaporization removal.

(Component (B))

In the silicone rubber composition of the embodiment of the present invention, the component (B) is a silica powder having a specific surface area of 50 to 400 m$^2$/g, and its compounding amount is 10 to 50 parts by mass to 100 parts by mass of the component (A). Hereinafter, the compounding amount of each component is expressed in terms of part by mass to 100 parts by mass of the component (A) unless otherwise specified, and it may be simply expressed as " . . . parts by mass" in some cases. The component (B) is a component having functions of imparting moderate fluidity to the silicone rubber composition and imparting excellent mechanical strength to the silicone rubber obtained by curing the composition.

In order for the silica powder being the component (B) to fulfill the aforesaid functions when being added to the composition of the present invention, the specific surface area of the silica powder is 50 to 400 m$^2$/g. In this specification, the specific surface area refers to a specific surface area by the BET method. Hereinafter, the silica powder having the specific surface area of 50 to 400 m$^2$/g will be also referred to as a silica powder (B). The specific surface area of the silica powder (B) is preferably 100 to 360 m$^2$/g, and more preferably 130 to 300 m$^2$/g. A kind of silica is not limited, and precipitated silica, aerosol silica (fumed silica), baked silica, or the like is suitably used. From the viewpoint of reinforcing properties, fumed silica is preferable.

In a typical silicone rubber composition, since a silica powder is used after surface-treated as necessary, a surface-untreated silica powder and a surface-treated silica powder are referred to as "silica powder" without any distinction, but in the silicone rubber composition of the embodiment of the present invention, the silica powder being the component (B) refers to only a surface-untreated silica powder that has not undergone the surface treatment.

As the silica powder (B), a commercially available product may be used. Examples of the commercially available product include AEROSIL 130 (specific surface area: 130 m$^2$/g), AEROSIL 200 (specific surface area: 200 m$^2$/g), and AEROSIL 300 (specific surface area: 300 m$^2$/g) which are aerosol silica and trade names of Evonic Industries. As the silica powder (B), one kind may be used, or two or more kinds may be used in combination.

The compounding amount of the component (B) in the silicone rubber composition of the present invention is 10 to 50 parts by mass, and preferably 15 to 40 parts by mass to 100 parts by mass of the component (A). If the compounding amount of the component (B) exceeds 50 parts by mass, the viscosity of the silicone rubber composition greatly increases, making it difficult to compound the component (B) into the component (A), and conversely if it is less than 10 parts by mass, roll operability of the silicone rubber composition worsens and the properties such as the mechanical strength of the obtained silicone rubber become insufficient.

The silicone rubber composition of the present invention can be a millable silicone rubber composition suitable for extrusion molding and achieving both a good shape retaining property and low hardness of an extrudate, with a smaller amount of the silica powder compounded therein than usual. In addition, since the fine spherical aggregates formed by the silica powder are exposed to the surface of the extrudate, the surface of the extrudate is excellent in slip property, which can prevent blocking. In a case where the silicone rubber composition of the present invention is used in extrusion molding, the compounding amount of the component (B) is preferably 10 to 40 parts by mass, and more preferably 15 to 40 parts by mass.

(Component (C))

The silicone rubber composition of the embodiment of the present invention contains a 1 to 10 part by mass organosilazane as the component (C).

The component (C) has a function of silylating the silanol groups on the surface of the silica powder being the component (B). This improves stability of the base compound consisting of the component (A), the component (B), and the component (C) and stability of the silicone rubber composition containing the component (D) in addition to the base compound. Further, ammonia is produced as a by-product at the time of the silylation, and the ammonia promotes the condensation reaction of the terminal silanol groups of the polyorganosiloxane diol being the component (A1) and the silanol groups on the surface of the silica powder being the component (B), which imparts a viscosity appropriate for roll operability to the base compound and the silicone rubber composition. Further, the component (C), when acting on the component (B) as described above, further has a function of promoting the formation of the fine spherical aggregates by the silica powder being the component (B) to improve blocking resistance of the extrudate.

Examples of the component (C) include: hexaorganodisilazanes such as hexamethyldisilazane, 1-vinylpentamethyldisilazane, 1,3-divinyl-1,1,3,3-tetramethyldisilazane, and 1,3-dimethyl-1,1,3,3-tetravinyldisilazane; and octaorganotrisilazanes such as octamethyltrisilazane and 1,5-divinylhexamethyltrisilazane. The component (C) may consist of one kind of these or two or more kinds of these.

As the component (C), hexamethyldisilazane and 1,3-divinyl-1,1,3,3-tetramethyldisilazane are preferable, and hexamethyldisilazane and a combination of hexamethyldisilazane and 1,3-divinyl-1,1,3,3-tetramethyldisilazane are more preferable.

A compounding amount of the component (C) is 1 to 10 parts by mass to 100 parts by mass of the organopolysiloxane being the component (A). The compounding amount of the component (C) is preferably 1 to 8 parts by mass, and more preferably 2 to 8 parts by mass. A compounding amount of the component (C) to 100 parts by mass of the component (B) is preferably 1 to 40 parts by mass, and more preferably 5 to 30 parts by mass.

If the compounding amount of the component (C) is too small, the component (B) in an amount large enough to impart mechanical strength to the obtained silicone rubber cannot be compounded, and storage stability of the composition is worsened. If the amount is too large, operability of the composition worsens, and it is also economically undesirable.

Incidentally, the ammonia and the low molecular siloxane, for example, hexamethyldisiloxane, produced as the by-product when the component (C) silylates the silanol groups on the surface of the silica powder being the component (B), and further the unreacted organosilazane can be easily removed by later-described heat treatment in a manufacturing process.

(Component (D))

The component (D) is a curing agent in a catalytic amount. The component (D) cures the silicone rubber composition, in particular, the base polymer being the component (A) into a rubbery elastomer. Examples of the curing agent being the component (D) include an organic peroxide (D1) and a combination (D2) of an addition crosslinking agent and a catalyst. In a case where the organic peroxide (D1) is used, the silicone rubber composition is cured by heating. In a case where the combination (D2) of the addition crosslinking agent and the catalyst is used, either thermal curing or ultraviolet curing (UV curing) can be selected depending on a kind of the catalyst. The organic peroxide (D1) and the combination (D2) of the addition crosslinking agent and the catalyst may be used in combination.

The organic peroxide (D1) is not limited, provided that it is one usually used in this type of composition for silicone rubber. Specific examples thereof include benzoyl peroxide, 2,4-dichlorobenzoyl peroxide, p-chlorobenzoyl peroxide, dicumyl peroxide, p-methylbenzoyl peroxide, 2,5-dimethyl-2,5-di(t-butylperoxy)hexane, 2,5-bis(t-butylperoxy)-2,5-dimethylhexane, di-t-butyl peroxide, t-butylperoxybenzoate, and bis(4-t-butylcyclohexyl)peroxydicarbonate.

Among these organic peroxides (D1), 2,4-dichlorobenzoyl peroxide, p-methylbenzoyl peroxide, and 2,5-bis(t-butylperoxy)-2,5-dimethylhexane are preferable, and 2,4-dichlorobenzoyl peroxide and p-methylbenzoyl peroxide are more preferable. As the component (D1), one kind may be used, or two kinds or more may be used in combination.

In the case where the organic peroxide (D1) is used as the curing agent in the composition of the embodiment of the present invention, a compounding amount of the component (D1) is an effective amount for catalyzing a curing reaction of the component (A). Specifically, the compounding amount is preferably 0.01 to 5 parts by mass, and more preferably 0.1 to 2 parts by mass to 100 parts by mass of the component (A). If the compounding amount of the component (D1) is less than 0.01 parts by mass, the curing reaction of the component (A) may not sufficiently take place, and if it exceeds 5 parts by mass, properties such as heat resistance of the obtained silicone rubber may deteriorate.

Examples of the addition crosslinking agent in the combination (D2) of the addition crosslinking agent and the catalyst include a polyorganohydrogensiloxane (D21) having a siloxane skeleton in which hydrogen atoms and organic groups are bonded with silicon atoms and having two or more of the hydrogen atoms on average in a molecule. The polyorganohydrogensiloxane (D21) component forms a crosslinked body when undergoing an addition reaction with the alkenyl groups of the component (A), owing to a function of the catalyst used together. The catalyst used is an addition reaction catalyst (D22) having a function to catalyze this addition reaction. In the component (D21), examples of the organic group bonded with the silicon atom include an unsubstituted or substituted monovalent hydrocarbon group whose range is the same as that of $R^1$ of the component (A1), and the organic group is preferably a methyl group because its synthesis and handling are easy. The siloxane skeleton of the component (D21) may be linear, branched, or cyclic.

In the component (D21), an amount of the hydrogen atoms bonded with the silicon atoms is preferably not less than 0.1 mmol/g nor more than 20 mmol/g as the content per mass. Such hydrogen atoms may be bonded with silicon atoms of intermediate units or may be bonded with silicon atoms at molecular ends. The hydrogen atoms are preferably bonded with the silicon atoms of the intermediate units.

An average degree of polymerization of the component (D21) is preferably 10 to 500 and more preferably 20 to 100 from the viewpoint of coming into contact with the component (A) while maintaining its liquid state at a reaction temperature of the addition reaction, and reducing the content of the low molecular siloxane. As the component (D21), one kind may be used, or two or more kinds may be used in combination.

Especially when the low viscosity component (A) is used as the component (A) especially in order for the obtained cured product to be on a level high enough to be a product without being post-cured, it is preferable also in the component (D21) that the low molecular siloxane is removed from the component (D21) until its low molecular siloxane content reaches the same content as the preferable content in the component (A), preferably until its mass reduction rate [%] falls within the same range as that of the mass reduction rate [%] in the component (A). As a removal method, the same method as is used for the component (A) is usable.

In a case where the composition of the embodiment of the present invention uses the component (D2) as the curing agent, a compounding amount of the component (D21) in the composition is an amount large enough to crosslink the component (A). The content of the component (D21) is such that a molar ratio of the hydrogen atoms bonded with the silicon atoms in the component (D21) to the alkenyl groups in the component (A) (the number of moles of the hydrogen atoms bonded with the silicon atoms of the component (D21)/the number of moles of the alkenyl groups of the component (A)) becomes 0.01 to 10. Further, in the composition of the present invention, the above molar ratio is preferably 0.1 to 5.

The addition reaction catalyst (D22) catalyzes the addition reaction of the alkenyl groups of the component (A) and hydrosilyl groups of the component (D21). The addition reaction catalyst (D22) includes for example at least one kind selected from a group consisting of platinum, rhodium, palladium, iridium and nickel. As the addition reaction catalyst (D22), a platinum-based catalyst similar to a platinum-based catalyst typically used for the aforesaid addition reaction is preferable. Examples of the platinum-based catalyst include a platinum-based catalyst activated by heat (hereinafter also referred to as "heat platinum-based catalyst") and a platinum-based catalyst activated by ultraviolet rays (hereinafter also referred to as "UV platinum-based catalyst").

Examples of the heat platinum-based catalyst include a compound containing a platinum-based metal, for example, a platinum-based metal fine powder, chloroplatinic acid, an alcohol-modified chloroplatinic acid, a complex of platinum and diketone, a complex of chloroplatinic acid and olefin, and a complex of chloroplatinic acid and alkenylsiloxane. Note that the platinum-based metal refers to platinum, rhodium, palladium, or the like. As the heat platinum-based catalyst, one kind may be used, or two kinds or more may be used in combination.

The UV platinum-based catalyst is an ultraviolet active catalyst designed as a compound containing a platinum-based metal so that catalytic activity is exhibited by ultraviolet ray irradiation. From the viewpoint of high reactivity and curing speed, examples of an especially preferable catalyst include ($\eta$5-cyclic pentadienyl)-trialkyl-platinum complexes which are exemplified below. Note Cp indicates cyclopentadienyl in the following complexes.
(Cp)trimethylplatinum
(Cp)ethyldimethylplatinum
(Cp)triethylplatinum
(Cp)triallylplatinum
(Cp)tripentylplatinum
(Cp)trihexylplatinum
(methyl-Cp)trimethylplatinum
(trimethylsilyl-Cp)trimethylplatinum
(phenyldimethylsilyl-Cp)trimethylplatinum
(Cp)acetyldimethylplatinum
(Cp)diethylmethylplatinum
(Cp)triisopropylplatinum
(Cp)tri(2-butyl)platinum
(Cp)trinonylplatinum
(Cp)tridodecylplatinum
(Cp)tricyclopentylplatinum
(Cp)tricyclohexylplatinum
(chloro-Cp)trimethylplatinum
(fluoro-Cp)trimethylplatinum
(Cp)dimethylbenzylplatinum
(triethylsilyl-Cp)trimethylplatinum
(dimethylphenylsilyl-Cp)trimethylplatinum
(methyldiphenylsilyl-Cp)trimethylplatinum
(triphenylsilyl-Cp)trihexylplatinum
[1,3-bis(trimethylsilyl)-Cp]trimethylplatinum
(dimethyloctadecylsilyl-Cp)trimethylplatinum
1,3-bis[(Cp)trimethylplatinum]tetramethyldisiloxane
1,3-bis[(Cp)trimethylplatinum]dimethyl diphenyl disiloxane
1,3-bis[(Cp)dimethylphenylplatinum]tetramethyldisiloxane
1,3,5-tris[(Cp)trimethylplatinum]pentamethyltrisiloxane
1,3,5,7-tetra[(Cp)trimethylplatinum]heptamethyltetrasiloxane
(methoxy-Cp)trimethylplatinum
(ethoxymethyl-Cp)ethyldimethylplatinum
(methoxycarbonyl-Cp)trimethylplatinum
(1,3-dimethyl-Cp)trimethylplatinum
(methyl-Cp)triisopropylplatinum
(1,3-diacetyl-Cp)diethylmethylplatinum
(1,2,3,4,5-pentachloro-Cp)trimethylplatinum
(phenyl-Cp)trimethylplatinum
(Cp)acetyldimethylplatinum
(Cp)propionyldimethylplatinum
(Cp)acryloyldimethylplatinum
(Cp)di(methacryloyl)ethylplatinum
(Cp)dodecanoyldimethylplatinum
trimethylplatinum cyclopentadienyl-terminated polysiloxane The most preferable UV platinum-based catalyst used in the present invention is a cyclopentadienyl-tris-alkyl-platinum compound which may be substituted by alkyl or trialkylsilyl, in particular, is alkylcyclopentadienyl-trimethyl-platinum, and in particular, methylcyclopentadienyl-trimethyl-platinum. As the UV platinum-based catalyst, one kind may be used, or two or more kinds may be used in combination.

In a case where the composition of the embodiment of the present invention uses the component (D2) as the curing agent, a compounding amount of the addition reaction catalyst (D22) in the composition is an amount with which the addition reaction of the component (A) and the component (D21) is catalyzed. Specifically, the compounding amount of the platinum-based catalyst including the heat platinum-based catalyst and the UV platinum-based catalyst is typically 0.1 to 1000 ppm in terms of platinum metal atom, to the total amount of the component (A) and the component (D21), and 0.1 to 100 ppm is preferable. With this compounding amount being within this range, the addition reaction of the component (A) and the component (D21) is sufficiently catalyzed and it is possible to obtain an excellent addition reaction rate. In addition, in order to achieve both the excellent addition reaction rate and pot life in extrusion molding, the compounding amount of the platinum-based catalyst is preferably 0.5 to 50 ppm and more preferably 1 to 20 ppm in terms of platinum metal atoms.

(Optional Components)

In the silicone rubber composition of the embodiment of the present invention, in addition to the above components, a polyorganosiloxane other than the aforesaid ones (hereinafter referred to as "other polyorganosiloxane") and various additives conventionally used according to various purposes may be compounded, within a range not impairing the effects of the present invention. In a case where the low viscosity component (A) is used as the component (A), as the other polyorganosiloxane, one whose mass reduction rate [%] is in a range equivalent to that of the preferable mass reduction rate [%] in the component (A) is preferable.

Examples of the additives include inorganic fillers other than the silica powder being the component (B), such as pulverized silica (quartz fine powder), diatomaceous earth, metal carbonate, clay, talc, mica, and titanium oxide, a conductive material such as carbon black, a pigment, a thixotropy imparting agent, a viscosity modifier for improving extrusion operability, an ultraviolet inhibitor, a fungicide, a heat resistance improver, a flame retardant, an antioxidant, and a reaction inhibitor of the addition reaction.

[Production of Silicone Rubber Composition]

It is possible to prepare the silicone rubber composition of the embodiment of the present invention by uniformly kneading the components (A) to (D) and, further other components to be compounded as required, by a mixing means such as a kneader.

In order for the terminal silanol groups of the polyorganosiloxane diol being the component (A1) contained in the component (A) and the silanol groups on the surface of the silica powder of the component (B) to sufficiently undergo the condensation reaction, it is preferable to knead the component (A), the component (B), and the component (C) to prepare the base compound, and thereafter compound the curing agent being the component (D) into the base compound. A preferable method to prepare the base compound is to gradually add the component (B) and the component (C) to the component (A) while kneading the component (A). The addition of the component (B) and the component (C) may be intermittent or may be continuous. Specifically, the component (B) and the component (C) are added to the component (A) in parts a plurality of times, or continuously at a predetermined rate.

A temperature at the time of kneading the component (A), the component (B), and the component (C) is preferably 100° C. or lower, and more preferably in a range of 20 to 70° C. Further, in order to remove the ammonia, the low molecular siloxane such as hexamethyldisilazane, the unreacted component (C), and so on, a step of heating a mixture obtained through the uniform kneading of the component (A), the component (B), and the component (C) at 100 to 200° C. is preferably provided before compounding the curing agent being the component (D). Specifically, the heating step is preferably carried out by heating and kneading, and its time is preferably 0.5 to 12 hours. Furthermore, it is preferable that, after the base compound thus obtained is cooled, the curing agent being the component (D) is compounded.

In the above-described production process of the silicone rubber composition of the embodiment of the present invention, a step of removing the low molecular siloxane, for example, the aforesaid heating step may be provided as necessary. In the silicone rubber composition of the embodiment of the present invention, particularly in order to obtain the cured product that has a sufficiently reduced low molecular siloxane content without being post-cured, a mass reduction rate [%] of the base compound before the component (D) is added to the composition is preferably 0.8% or less, more preferably 0.6% or less, and still more preferably 0.3% or less.

The contents of the low molecular siloxane in the component (A), the base compound, the silicone rubber composition, and so on can also be analyzed by gas chromatography or the like. In the silicone rubber composition of the present invention, in the case where it is the low viscosity component (A)-containing silicone rubber composition, the content of cyclic siloxane whose degree of polymerization is 10 or less can be preferably, for example, 1000 ppm or less, more preferably 500 ppm or less, and still more preferably 300 ppm or less.

[Silicone Rubber (Cured Product)]

In order to obtain a silicone rubber using the silicone rubber composition of the embodiment of the present invention, firstly, the silicone rubber composition is molded into a desired shape by a method such as, for example, press molding, transfer molding, injection molding, extrusion molding, or calendar molding. In a case where the organic peroxide (D1) is used as the component (D), by carrying out the above molding under conditions of, for example, 100 to 400° C. and about three to thirty minutes, depending on a decomposition temperature or the like of the organic peroxide, it is possible to obtain, as a molded body, a silicone rubber resulting from the curing of the silicone rubber composition.

In a case where the combination (D2) of the addition crosslinking agent and the catalyst is used as the component (D) and the addition reaction catalyst (D22) is the heat platinum-based catalyst, by carrying out the above molding under conditions of, for example, 100 to 400° C. and about one to sixty minutes, depending on a temperature at which the heat platinum-based catalyst used is activated, it is possible to obtain, as the molded body, a silicone rubber resulting from the curing of the silicone rubber composition.

In a case where the addition reaction catalyst (D22) is the UV platinum-based catalyst, by the UV irradiation to a silicone rubber composition molded body obtained after the aforesaid molding is carried out, it is possible to obtain the molded body of the silicone rubber resulting from the curing of the silicone rubber composition. A wavelength of the ultraviolet rays for the irradiation depends on a kind of the UV platinum-based catalyst used, and it can usually be 200 nm to 400 nm, and preferably 250 nm to 400 nm. Irradiation energy can be set to 100 mJ/cm$^2$ to 100,000 mJ/cm$^2$ as the cumulative amount of light at 365 nm.

The silicone rubber composition of the present invention can be prepared using a base polymer having a wide viscosity range as the component (A), and is a millable type silicone rubber composition having good roll operability and extrusion moldability.

The silicone rubber composition of the present invention has a good shape retaining property even with a smaller amount of the compounding amount of the silica powder being the component (B) than in a conventional product, which makes it possible to obtain a low-hardness cured product having good roll operability and extrusion moldability. In particular, the surface of the extrudate is excellent in slip property and the extrudate does not suffer blocking.

The extrudate obtained from the silicone rubber composition of the present invention is preferably one having, on its surface, the granular protrusions whose maximum diameter measured in the SEM image is 0.1 to 30 μm. As described above, in the silicone rubber composition of the present invention, the components (B) bond together during the kneading to form the fine spherical aggregates, and the spherical aggregates are partly exposed to the surface of the extrudate. That is, the spherical aggregates are observed as the granular protrusions which are part or the whole, of the spherical aggregates, exposed from the surface of the extrudate which is flat as a whole. Out of the granular protrusions observed in the SEM image in this manner, the number of granular protrusions having a maximum diameter of 0.1 to 30 μm per 100 μm×100 μm, which covers an area of 0.01 mm$^2$, is preferably 1 to 300 pieces/0.01 mm$^2$, and more preferably 10 to 200 pieces/0.01 mm$^2$.

The number of the granular protrusions having the maximum diameter of 0.1 to 30 μm per 100 μm×100 μm (0.01 mm$^2$) on the surface of the extrudate obtained from the silicone rubber composition of the present invention is preferably within the above range as an average value at five places.

Further, when the component (A) is the low viscosity component (A) which can be a liquid base polymer in which the low molecular siloxane is sufficiently removed, the use of the low viscosity component (A)-containing silicone rubber composition makes it possible to easily obtain the cured product that has a very small low molecular siloxane content without being post-cured.

The production method of the present invention is a method which molds the low viscosity component (A)-containing silicone rubber composition or the silicone rubber composition of the present invention in which the mass reduction rate of the component (A) in before and after the normal-pressure, 200° C., four-hour heat treatment is 1.0% or less, and cures the resultant by heat or UV irradiation to produce the silicone rubber molded product whose mass reduction rate in before and after the normal-pressure, 200° C., four-hour heat treatment is 0.5% or less, without performing the post-curing.

For example, in a case where the component (D) is the organic peroxide (D1), the mass reduction rate [%] of the cured product which is obtained through the 170° C. and ten-minute curing of the low viscosity component (A)-containing silicone rubber composition or the silicone rubber composition of the present invention in which the mass reduction rate of the component (A) in before and after the normal-pressure, 200° C., four-hour heat treatment is 1.0% or less can be about 0.5% or less. The mass reduction rate [%] of the cured product in this case is preferably 0.3% or less, and more preferably 0.2% or less. Further, in the cured product, the content of the cyclic siloxane whose degree of polymerization is 10 or less can be 1000 ppm or less, preferably 500 ppm or less, and more preferably 300 ppm or less.

Further, for example, in a case where the component (D) is the combination of the polyorganohydrogensiloxane (D21) and the addition reaction catalyst (D22) and the addition reaction catalyst (D22) is the heat platinum-based catalyst, the mass reduction rate [%] of the cured product which is obtained through the 120° C. and ten-minute curing of the low viscosity component (A)-containing silicone rubber composition or the silicone rubber composition of the present invention in which the mass reduction rate of the component (A) in before and after the normal-pressure, 200° C., four-hour heat treatment is 1.0% or less can be about 0.5% or less. In this case, the mass reduction rate [%] of the cured product is preferably 0.3% or less, and more preferably 0.2% or less.

Further, in a case where the addition reaction catalyst (D22) is the UV platinum-based catalyst in the above, the mass reduction rate [%] of the cured product obtained when the low viscosity component (A)-containing silicone rubber composition or the silicone rubber composition of the present invention in which the mass reduction rate of the component (A) in before and after the normal-pressure, 200° C., four-hour heat treatment is 1.0% or less is cured under the condition of 365 nm and a 7200 mJ/cm$^2$ cumulative light amount can be about 0.5% or less. In this case, the mass reduction rate [%] of the cured product is preferably 0.3% or less, and more preferably 0.2% or less. Further, in the cured product, the content of the cyclic siloxane whose degree of polymerization is 10 or less can be 1000 ppm or less, more preferably 500 ppm or less, and more preferably 300 ppm or less.

EXAMPLES

Hereinafter, examples of the present invention will be described, but the present invention is not limited to these examples.

In the following examples and comparative examples, polyorganosiloxanes to be described below were used as the component (A1), the component (A2), and the component (D21). Siloxane units are indicated by the following symbols.

M unit: $(CH_3)_3SiO_{1/2}$—
$M^{Vi}$ unit: $(CH_3)_2(CH_2=CH)SiO_{1/2}$—
$M^{OH}$ unit: $(CH_3)_2(OH)SiO_{1/2}$—
D unit: —$(CH_3)_2SiO$—
$D^H$ unit: —$(CH_3)HSiO$—
$D^{Vi}$ unit: —$(CH_3)(CH_2=CH)SiO$—

As the polyorganosiloxane diol being the component (A1) and the polyorganosiloxane being the component (A2), linear polyorganosiloxane polymers each having the structural formula, the mass reduction rate [%], the viscosity [Pas], the silanol group content [mmol/g], and the alkenyl group content [mmol/g] shown in Table 1 below were used. Further, a polyorganosiloxane diol (A1-cf) that is a polyorganosiloxane but does not satisfy the requirement of the component (A1) is also shown as a comparative example in Table 1.

TABLE 1

| COM-PONENT | ABBRE-VIATION | STRUCTURAL FORMULA | MASS REDUCTION RATE [%] | VISCOSITY [Pas] | SILANOL GROUP CONTENT [mmol/g] | ALKENYL GROUP CONTENT [mmol/g] |
|---|---|---|---|---|---|---|
| (A1) | (A11-1) | $M^{OH}D_{12}{}^{Vi}D_{800}M^{OH}$ | 0.91 | 44 | 0.03 | 0.2 |
|  | (A12-1) | $M^{OH}D_{450}M^{OH}$ | 1.52 | 6.1 | 0.07 | — |
|  | (A12-2) | $M^{OH}D_{550}M^{OH}$ | 0.24 | 12 | 0.05 | — |
|  | (A12-3) | $M^{OH}D_{800}M^{OH}$ | 1.58 | 48 | 0.03 | — |
|  | (A1-cf) | $M^{OH}D_{160}M^{OH}$ | 1.05 | 0.6 | 0.17 | — |
| (A2) | (A21-1) | $M^{Vi}D_{130}M^{Vi}$ | 0.23 | 0.4 | — | 0.2 |
|  | (A21-2) | $M^{Vi}D_{4400}M^{Vi}$ | 3.25 | 13000 | — | 0.006 |
|  | (A21-3) | $M^{Vi}D_{21}{}^{Vi}D_{7000}M^{Vi}$ | 3.10 | 37000 | — | 0.045 |
|  | (A21-4) | $M^{Vi}D_{550}M^{Vi}$ | 0.20 | 12.0 | — | 0.05 |

Further, in the examples and the comparative examples, the following silica powders, organosilazanes, and curing agents were used as the component (B), the component (C), and the component (D) respectively. The silica powder (Bcf) is a surface-treated silica powder for a comparative example.

Component (B); aerosol silica
(B1); AEROSIL 130 (trade name, manufactured by EVONIC Industries) having a specific surface area of 130 m$^2$/g
(B2); AEROSIL 200 (trade name, manufactured by EVONIC Industries) having a specific surface area of 200 m$^2$/g
(B3); AEROSIL 300 (trade name, manufactured by EVONIC Industries) having a specific surface area of 300 m$^2$/g
(Bcf); dimethyldichlorosilane-treated product of AEROSIL 130 (carbon content on the silica surface; 1.0% by mass)
Component (C); organosilazane
(C1); hexamethyldisilazane
(C2); 1,3-divinyl-1,1,3,3-tetramethyldisilazane
Component (D); curing agent
Organic peroxide (D1)
(D11); p-methylbenzoyl peroxide
Combination (D2) of addition crosslinking agent and catalyst (D21); MD$^H_{20}$D$_{20}$M (hydrosilyl group content 7.4 [mmol/g], mass reduction rate 1.0 [%])
(D22); (methylcyclopentadienyl)trimethylplatinum Examples 1 to 23 and Comparative Examples 1 to 7

Silicone rubber compositions of Examples 1 to 23 were produced as follows with the compositions shown in Tables 2 to 5. Similarly, silicone rubber compositions of Comparative Examples 1 to 7 were produced as follows as base compounds not containing the component (D), with the compositions shown in Table 6.

First, the component (A1) and the component (A2) were mixed by a kneader, whereby the component (A) was prepared. The component (B) and the component (C) were compounded in the component (A) in the kneader while being continuously added to the component (A) for twenty to sixty minutes, the mixture was kneaded at 50° C. for one hour and then heated and kneaded at 150° C. for two hours, and was cooled to 40° C. or lower, whereby each base compound was prepared. The component (D) was compounded in the base compounds by a kneader or a twin roll, whereby the silicone rubber compositions were obtained.

In Tables 2 to 6, the viscosity [Pas], alkenyl group content [mmol/g], and mass reduction rate [%] of the component (A) and the mass reduction rate [%] of the base compound are shown together with the composition. Note that the alkenyl group content [mmol/g] and the mass reduction rate [%] of the component (A) are calculated values.

In Tables 2 to 6, "phc" in (D11) and (D21) is the compounding amount (parts by mass) to 100 parts by mass of the base compound made up of the component (A), the component (B), and the component (C). In (D22), ppmPt represents ppm in terms of platinum metal atom to the total amount of the component (A), the component (B), and the component (C) (base compound) and the component (D21). In Tables 2 to 6, the blank indicates that the compounding amount is "0", and "-" indicates non-execution.

[Evaluation]

(1) Base Compound, Silicone Rubber Composition

Regarding each of the base compounds before the addition of the component (D) in the silicone rubber compositions, the mass reduction rate [%] was measured by the following method and plasticity number and roll operability were evaluated. In addition, regarding each of the silicone rubber compositions of Examples 9 to 23 and Comparative Examples 2, 5, extrusion workability was evaluated. The results are also shown in Tables 2 to 6. The plasticity number and the roll operability were evaluated using the base compounds, and similar results are also expected in the silicone rubber compositions containing the component (D).

(Mass Reduction Rate)

The base compounds obtained in the examples above were each taken out as an appropriate size sample and a mass (w1) thereof was measured. The samples were placed in a 200° C. oven and left standing for four hours and then were taken out, and a mass (w2) thereof was measured, and the mass reduction rate [%] ((w1−w2)/w1×100) was calculated.

(Roll Operability)

A gap of a 6-inch twin roll was adjusted to 3 mm, and about 200 g of each of the base compounds was subjected to a rolling operation for five minutes (about 50 rolling over) and roll operability was evaluated. A case where the base compound wound smoothly along the roll and tackiness of the base compound to the roll surface was appropriate and there was no problem in the roll operation was evaluated as good.

(Plasticity Number)

In conformity with JIS K6249, the plasticity number of each of the base compounds was measured using a parallel plate plastometer (Williams Plastometer) with a five-minute of re-kneading time, a five-minute of standing time, and a five-minute of pressing time.

(Extrusion Workability)

The silicone rubber compositions of Examples 9 to 23 and Comparative Examples 2 and 5 described above were extruded in a horizontal direction at a rate of 2 m/min using an extruder with a 30 mm screw diameter φ which has a tubular die with an 8 mm outside diameter and a 6 mm inside diameter, and as for the silicone rubber compositions of Examples 9 to 11, their uncured tubular compounds extruded to a length of about 50 cm were placed in a 200° C. oven and heated for five minutes, whereby tubular cured products were fabricated. As for the silicone rubber cured products of Examples 12 to 23 and Comparative Examples 2 and 5, immediately after the extrusion, they were irradiated with 365 nm ultraviolet rays with an irradiation intensity of 800 mW/cm$^2$ by an ultraviolet lamp (manufactured by Nordson, Coolwave 2-410) equipped with a lamp box (manufactured by Nordson, Thrucure) for extrusion molding, whereby tubular cured products were continuously fabricated. The cumulative dose is about 6000 mJ/cm$^2$.

In a case where the obtained tubular cured product had a smooth surface with no defect such as a sharkskin and was sufficiently cured without deformation due to its own weight, the extrusion workability was evaluated as good.

(Evaluation of Extrudate)

Blocking Resistance

After the cured tubes were wound up and left standing at room temperature for one day, the presence or absence of adhesion of the surfaces of the tubes was visually confirmed, and those where no adhesion was observed were evaluated as having "good" blocking resistance, and those where adhesion was observed were evaluated as having "no" blocking resistance.

Appearance, the Number of Protrusions [pieces/0.01 mm$^2$]

Further, regarding the state of each of the tube surfaces, the appearance was confirmed. Furthermore, SEM images of the tube surfaces were observed and analyzed with EPMA (electron beam probe microanalyzer)-EDS (energy dispersive X-ray spectrometer).

Figure 1B:
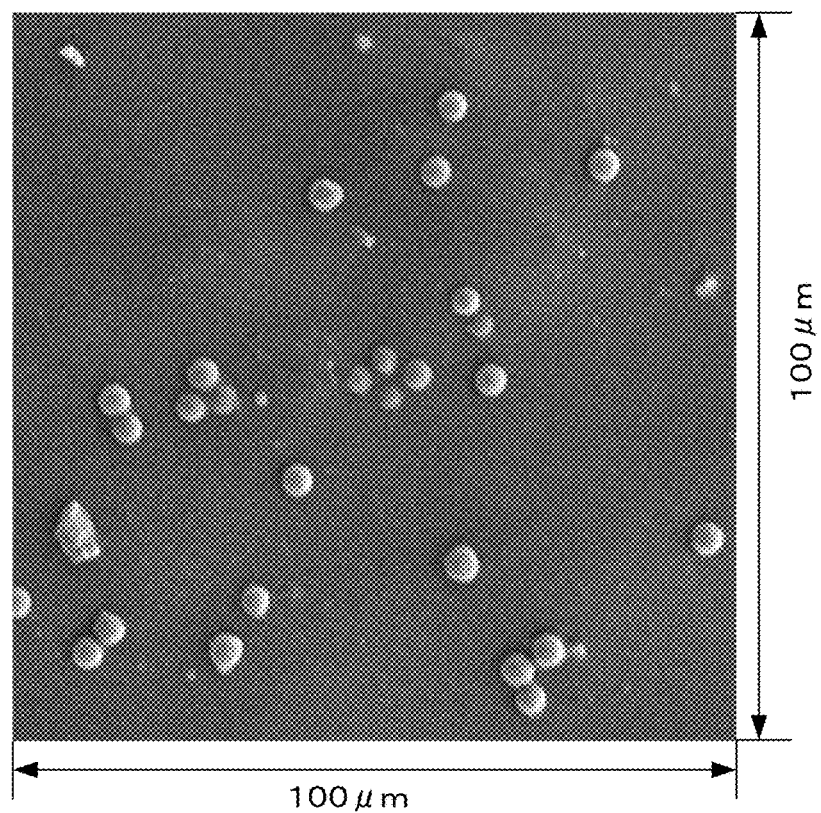
FIG. 1B is a photograph showing a 100 μm×100 μm area of an enlarged SEM photograph (×250) of the surface of the silicone rubber extrudate obtained in Example 12.
Figure 1C:
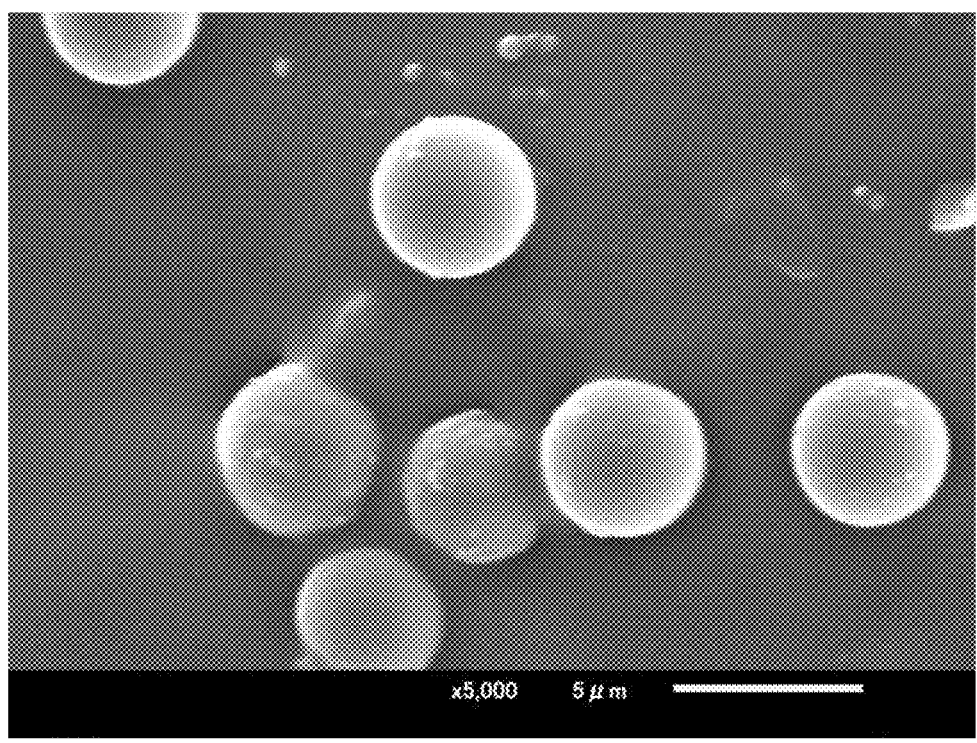
FIG. 1C is a SEM photograph (×5000) of the surface of the silicone rubber extrudate obtained in Example 12.

FIG. 1A illustrates a SEM photograph (1-magnification) of the tube surface obtained in Example 12, FIG. 1B illustrates a photograph showing a 100 μm×100 μm area of a 250-magnification SEM photograph of the same tube surface, and FIG. 1C illustrates a 5000-magnification SEM photograph of the same tube surface (the length of the white line at the lower right of the photograph is 5 μm).

250-magnification SEM images of the tube surfaces obtained in Examples 12, 13, 14, 15, and 20 were analyzed, and the number of granular protrusions with a 0.1 to 30 μm maximum diameter per 100 μm×100 μm (0.01 mm$^2$) area was counted. Note that the number of the granular protrusions per 0.01 mm$^2$ is an average number of the numbers measured at any five points in the 250-magnification photograph.

(2) Cured Product

Various test pieces were fabricated using the silicone rubber compositions of the examples obtained above and the following evaluation items were evaluated. The results are also shown in Tables 2 to 6.

(Preparation of Test Pieces)

Examples 1 to 11

The silicone rubber compositions obtained above were press-molded under conditions of 120° C. and fifteen minutes, and dumbbells No. 3 were fabricated as test pieces for measurement of mechanical properties (hardness, tensile strength, elongation) in conformity with JIS K6249.

Examples 12 to 23 and Comparative Examples 2 and 5

The silicone rubber compositions obtained above were each pressed into a sheet at room temperature and were subjected to 60 mW/cm$^2$ and 120-second UV-irradiation at 25° C. using a UV lamp. Irradiation energy was 7200 mJ/cm$^2$ as the cumulative amount of light at 365 nm. From the obtained sheets, dumbbells No. 3 were fabricated as test pieces for measurement of mechanical properties (hardness, tensile strength, elongation) in conformity with JIS K6249.

(Mechanical Properties)

The density of each of the silicone rubbers was measured using the test pieces for measurement of mechanical properties. Further, hardness (Type A), tensile strength [MPa], and elongation [%] were measured according to JIS K6249.

(Mass Reduction Rate)

The silicone rubber compositions obtained in Examples 1 to 11 were press-molded under the same conditions as those when the test pieces for measurement of mechanical properties were fabricated, whereby silicone rubber sheets were obtained. The silicone rubber compositions obtained in Examples 12 to 23 were cured using a UV lamp in the same manner as when the test pieces for measurement of mechanical properties were fabricated, whereby silicone rubber sheets were obtained. These silicone rubber sheets were cut into sample sheets with an appropriate size and their mass (w1) was measured. The sample sheets were placed in a 200° C. oven, left standing for four hours, and then were taken out, and the mass (w2) thereof was measured, and the mass reduction rate [%] ((w1−w2)/w1×100) was calculated.

(Measurement of Low Molecular Siloxane Content)

The silicone rubber compositions obtained in Examples 1 and 3 were press-molded under conditions of 170° and ten minutes in the same manner as when the test pieces for measurement of mechanical properties were fabricated, whereby silicone rubber sheets were obtained. The silicone rubber compositions obtained in Examples 12 and 15 were cured using a UV lamp in the same manner as when the test pieces for measurement of mechanical properties were fabricated, whereby silicone rubber sheets were obtained. These silicone rubber sheets were immersed in n-hexane, low molecular siloxane was extracted therefrom, and an amount of the low molecular siloxane contained in each extract was quantified by gas chromatography (manufactured by Agilent Technologies, 6890 type), whereby the content of cyclic siloxane with a degree of polymerization of 4 to 10 contained in each of the silicone rubbers was found. The results are shown in Tables 2 to 5.

TABLE 2

| | | | | EXAMPLE | 1 | 2 | 3 | 4 | 5 |
|---|---|---|---|---|---|---|---|---|---|
| SILICONE RUBBER COMPOSITION (PART BY MASS) | BASE COMPOUND COMPOSITION (PART BY MASS) | (A) | (A1) | (A11-1) | | | | 100 | |
| | | | | (A12-1) | | | | | |
| | | | | (A12-2) | 90 | 90 | 90 | | 50 |
| | | | | (A12-3) | | | | | |
| | | | (A2) | (A21-1) | | | 10 | | |
| | | | | (A21-2) | | | | | 25 |
| | | | | (A21-3) | 10 | 10 | | | |
| | | | | (A21-4) | | | | | 25 |
| | | | | VISCOSITY [Pas] | 80 | 80 | 8.4 | 44 | 300 |
| | | | | ALKENYL GROUP CONTENT [mmol/g] | 0.0045 | 0.0045 | 0.02 | 0.2 | 0.014 |
| | | | | MASS REDUCTION RATE [%] | 0.53 | 0.53 | 0.24 | 0.91 | 0.98 |
| | | (B) | (B1) | | 40 | | | | |
| | | | (B2) | | | | 36 | | 24 |
| | | | (B3) | | | 26 | | 22 | |
| | | (C) | (C1) | | 2.4 | 3.6 | 3 | 3 | 3 |
| | | | (C2) | | 0.125 | 0.125 | 0.125 | | |
| | | MASS REDUCTION RATE OF BASE COMPOUND [%] | | | 0.30 | 0.34 | 0.27 | — | — |
| | | (D) | (D11) | | 0.75 phc | 0.75 phc | 0.75 phc | 0.75 phc | 0.75 phc |
| EVALUATION | BASE COMPOUND | ROLL OPERABILITY | | | GOOD | GOOD | GOOD | GOOD | GOOD |
| | | PLASTICITY NUMBER | | | 206 | 200 | 207 | 175 | 170 |
| | | EXTRUSION WORKABILITY OF SILICONE RUBBER COMPOSITION | | | — | — | — | — | — |
| | CURED PRODUCT | HARDNESS (Type A) | | | 22 | 18 | 27 | 40 | 26 |
| | | TENSILE STRENGTH [MPa] | | | 1.1 | 0.9 | 1.1 | 4.6 | 1.6 |
| | | ELONGATION [%] | | | 145 | 145 | 130 | 130 | 110 |
| | | DENSITY [g/cm$^3$] | | | 1.15 | 1.09 | 1.13 | 1.08 | 1.09 |
| | | MASS REDUCTION RATE [%] | | | 0.21 | 0.24 | 0.15 | 0.48 | 0.47 |
| | | LOW MOLECULAR SILOXANE CONTENT [ppm] | | | 430 | — | 120 | — | — |
| | | EXTRUDATE | APPEARANCE | | — | — | — | — | — |
| | | | NUMBER OF PROTRUSIONS [PIECES/0.01 mm$^2$] | | | | | | |

TABLE 2-continued

| EXAMPLE | 1 | 2 | 3 | 4 | 5 |
|---|---|---|---|---|---|
| BLOCKING RESISTANCE | — | — | — | — | — |

TABLE 3

| | | | | EXAMPLE | | 6 | 7 | 8 | 9 | 10 | 11 |
|---|---|---|---|---|---|---|---|---|---|---|---|
| SILICONE RUBBER COMPOSITION (PART BY MASS) | BASE COMPOUND COMPOSITION (PART BY MASS) | (A) | (A1) | (A11-1) | | | | | | | |
| | | | | (A12-1) | | | | | | 50 | 30 |
| | | | | (A12-2) | | 60 | | | 90 | | |
| | | | | (A12-3) | | | 55 | 50 | | | |
| | | (A2) | (A21-1) | | | | | | | | |
| | | | | (A21-2) | | 15 | 45 | 50 | | 50 | |
| | | | | (A21-3) | | | | | 10 | | 70 |
| | | | | (A21-4) | | 25 | | | | | |
| | | | | VISCOSITY [Pas] | | 120 | 1900 | 1400 | 80 | 1800 | 12000 |
| | | | | ALKENYL GROUP CONTENT [mmol/g] | | 0.013 | 0.0027 | 0.003 | 0.0045 | 0.003 | 0.0315 |
| | | | | MASS REDUCTION RATE [%] | | 0.68 | 2.42 | 2.42 | 0.53 | 2.39 | 2.63 |
| | | (B) | (B1) | | | | | | | | |
| | | | (B2) | | | 26 | | | 32 | 16 | 15 |
| | | | (B3) | | | | 18 | 10.5 | | | |
| | | (C) | (C1) | | | 3 | 5.4 | 3.4 | 3 | 3 | 3 |
| | | | (C2) | | | | | | 0.125 | | |
| | | | MASS REDUCTION RATE OF BASE COMPOUND [%] | | | — | 1.28 | 1.23 | 0.33 | — | — |
| | (D) | | | (D11) | | 0.75 phc | 0.75 phc | 0.75 phc | 0.75 phc | 0.75 phc | 0.75 phc |
| EVALUATION | BASE COMPOUND | ROLL OPERABILITY | | | | GOOD | GOOD | GOOD | GOOD | GOOD | GOOD |
| | | PLASTICITY NUMBER | | | | 175 | 180 | 130 | 180 | 170 | 175 |
| | EXTRUSION WORKABILITY OF SILICONE RUBBER COMPOSITION | | | | | — | — | — | GOOD | GOOD | GOOD |
| | CURED PRODUCT | HARDNESS (Type A) | | | | 25 | 10 | 7 | 20 | 15 | 20 |
| | | TENSILE STRENGTH [MPa] | | | | 1.2 | 3.1 | 1.2 | 1.0 | 1.6 | 1.4 |
| | | ELONGATION [%] | | | | 130 | 980 | 470 | 140 | 100 | 120 |
| | | DENSITY [g/cm$^3$] | | | | 1.09 | 1.06 | 1.02 | 1.12 | 1.09 | 1.09 |
| | | MASS REDUCTION RATE [%] | | | | 0.37 | 0.94 | 0.92 | 0.25 | — | — |
| | | LOW MOLECULAR SILOXANE CONTENT [ppm] | | | | — | — | — | — | — | — |
| | EXTRUDATE | APPEARANCE | | | | — | — | — | NOT GLOSSY | NOT GLOSSY | NOT GLOSSY |
| | | NUMBER OF PROTRUSIONS [PIECES/0.01 mm$^2$] | | | | — | — | — | — | — | — |
| | | BLOCKING RESISTANCE | | | | — | — | — | GOOD | GOOD | GOOD |

TABLE 4

| | | | | EXAMPLE | | 12 | 13 | 14 | 15 | 16 | 17 |
|---|---|---|---|---|---|---|---|---|---|---|---|
| SILICONE RUBBER COMPOSITION (PART BY MASS) | BASE COMPOUND COMPOSITION (PART BY MASS) | (A) | (A1) | (A11-1) | | | | | | 100 | |
| | | | | (A12-1) | | | | | | | |
| | | | | (A12-2) | | 90 | 90 | 90 | 90 | | |
| | | | | (A12-3) | | | | | | | 50 |
| | | (A2) | (A21-1) | | | | | | 10 | | |
| | | | | (A21-2) | | | | | | | 25 |
| | | | | (A21-3) | | 10 | 10 | 10 | | | |

TABLE 4-continued

| EXAMPLE | | | | | 12 | 13 | 14 | 15 | 16 | 17 |
|---|---|---|---|---|---|---|---|---|---|---|
| | MASS) | | | (A21-4) | | | | | | 25 |
| | | | | VISCOSITY [Pas] | 80 | 80 | 80 | 8.4 | 44 | 300 |
| | | | | ALKENYL GROUP CONTENT [mmol/g] | 0.0045 | 0.0045 | 0.0045 | 0.02 | 0.2 | 0.014 |
| | | | | MASS REDUCTION RATE [%] | 0.53 | 0.53 | 0.53 | 0.24 | 0.91 | 0.98 |
| | | (B) | (B1) | | 40 | | | | | |
| | | | (B2) | | | 32 | | 36 | | 24 |
| | | | (B3) | | | | 26 | | 22 | |
| | | (C) | (C1) | | 2.4 | 3 | 3.6 | 3 | 3 | 3 |
| | | | (C2) | | 0.125 | 0.125 | 0.125 | 0.125 | | |
| | | MASS REDUCTION RATE OF BASE COMPOUND [%] | | | 0.30 | 0.33 | 0.34 | 0.27 | — | — |
| | | (D) | (D11) | | 0.34 phc | 0.36 phc | 0.38 phc | 0.65 phc | 1 phc | 0.38 phc |
| | | | (D22) | | 8 ppmPt | 8 ppmPt | 8 ppmPt | 8 ppmPt | 8 ppmPt | 8 ppmPt |
| EVALU-ATION | BASE COM-POUND | ROLL OPERABILITY | | | GOOD | GOOD | GOOD | GOOD | GOOD | GOOD |
| | | PLASTICITY NUMBER | | | 206 | 180 | 200 | 207 | 175 | 170 |
| | EXTRUSION WORKABILITY OF SILICONE RUBBER COMPOSITION | | | | GOOD | GOOD | GOOD | GOOD | GOOD | GOOD |
| | CURED PRO-DUCT | HARDNESS (Type A) | | | 22 | 18 | 17 | 26 | 42 | 26 |
| | | TENSILE STRENGTH [MPa] | | | 1.2 | 1.0 | 0.9 | 1.3 | 4.8 | 1.4 |
| | | ELONGATION [%] | | | 140 | 160 | 155 | 135 | 140 | 120 |
| | | DENSITY [g/cm$^3$] | | | 1.15 | 1.12 | 1.09 | 1.13 | 1.08 | 1.09 |
| | | MASS REDUCTION RATE [%] | | | 0.21 | 0.24 | 0.24 | 0.14 | 0.43 | 0.45 |
| | | LOW MOLECULAR SILOXANE CONTENT [ppm] | | | 430 | — | — | 120 | — | — |
| | EXTRU-DATE | APPEARANCE | | | NOT GLOSSY | NOT GLOSSY | NOT GLOSSY | NOT GLOSSY | NOT GLOSSY | NOT GLOSSY |
| | | NUMBER OF PROTRUSIONS [PIECES/0.01 mm$^2$] | | | 27 | 38 | 125 | 56 | — | — |
| | | BLOCKING RESISTANCE | | | GOOD | GOOD | GOOD | GOOD | GOOD | GOOD |

TABLE 5

| EXAMPLE | | | | | | 18 | 19 | 20 | 21 | 22 | 23 |
|---|---|---|---|---|---|---|---|---|---|---|---|
| SILICONE RUBBER COMPOSITION (PART BY MASS) | BASE COM-POUND COMPO-SITION (PART BY MASS) | (A) | (A1) | (A11-1) | | | | | | | |
| | | | | (A12-1) | | | | | 50 | 30 | |
| | | | | (A12-2) | | 60 | | | | | |
| | | | | (A12-3) | | | 55 | 50 | | | 50 |
| | | | (A2) | (A21-1) | | | | | | | |
| | | | | (A21-2) | | 15 | 45 | 50 | 50 | | 50 |
| | | | | (A21-3) | | | | | | 70 | |
| | | | | (A21-4) | | 25 | | | | | |
| | | | | VISCOSITY [Pas] | | 120 | 1900 | 1400 | 1800 | 12000 | 1300 |
| | | | | ALKENYL GROUP CONTENT [mmol/g] | | 0.013 | 0.0027 | 0.003 | 0.003 | 0.0315 | 0.003 |
| | | | | MASS REDUCTION RATE [%] | | 0.68 | 2.42 | 2.42 | 2.39 | 2.63 | 1.75 |

TABLE 5-continued

| | | | EXAMPLE | 18 | 19 | 20 | 21 | 22 | 23 |
|---|---|---|---|---|---|---|---|---|---|
| | | (B) | (B1) | | | | | | |
| | | | (B2) | 26 | | | 16 | 15 | 25 |
| | | | (B3) | | 18 | 10.5 | | | |
| | | (C) | (C1) | 3 | 5.4 | 3.4 | 3 | 3 | 3 |
| | | | (C2) | | | | | | 0.125 |
| | | | MASS REDUCTION RATE OF BASE COMPOUND [%] | — | 1.28 | 1.23 | — | — | — |
| | | (D) | (D11) | 0.35 phc | 0.05 phc | 0.05 phc | 0.1 phc | 0.1 phc | 0.2 phc |
| | | | (D22) | 8 ppmPt | 8 ppmPt | 8 ppmPt | 8 ppmPt | 8 ppmPt | 9 ppmPt |
| EVALU-ATION | BASE COM-POUND | ROLL OPERABILITY | | GOOD | GOOD | GOOD | GOOD | GOOD | GOOD |
| | | PLASTICITY NUMBER | | 175 | 180 | 130 | 170 | 175 | 170 |
| | EXTRUSION WORKABILITY OF SILICONE RUBBER COMPOSITION | | | GOOD | GOOD | GOOD | GOOD | GOOD | GOOD |
| | CURED PRO-DUCT | HARDNESS (Type A) | | 25 | 9 | 5 | 12 | 18 | 20 |
| | | TENSILE STRENGTH [MPa] | | 1.2 | 2.5 | 1.3 | 1.4 | 1.2 | 1.1 |
| | | ELONGATION [%] | | 150 | 840 | 530 | 12 | 150 | 130 |
| | | DENSITY [g/cm$^3$] | | 1.09 | 1.06 | 1.02 | 1.09 | 1.09 | 1.13 |
| | | MASS REDUCTION RATE [%] | | 0.32 | 0.94 | 0.92 | — | — | — |
| | | LOW MOLECULAR SILOXANE CONTENT [ppm] | | — | — | — | — | — | — |
| | EXTRU-DATE | APPEAR-ANCE | | NOT GLOSSY | NOT GLOSSY | NOT GLOSSY | NOT GLOSSY | NOT GLOSSY | NOT GLOSSY |
| | | NUMBER OF PRO-TRUSIONS [PIECES/ 0.01 mm$^2$] | | — | — | 22 | — | — | — |
| | | BLOCKING RESIST-ANCE | | GOOD | GOOD | GOOD | GOOD | GOOD | GOOD |

TABLE 6

| EXAMPLE | | | | 1 | 2 | 3 | 4 | 5 | 6 | 7 |
|---|---|---|---|---|---|---|---|---|---|---|
| SILICONE RUBBER COMPOSITION (PART BY MASS) | BASE COMPOUND COMPOSITION (PART BY MASS) | (A1) | (A11-1) | | | | | | | |
| | | | (A12-1) | | | | | 10 | | 10 |
| | | | (A12-2) | | | 90 | | | 90 | 90 |
| | | | (A12-3) | | | | 50 | | | |
| | | | (A1-cf) | | | | | | | |
| | | (A2) | (A21-1) | 100 | 100 | | | | | |
| | | | (A21-2) | | | 10 | 50 | 90 | 10 | 80 |
| | | | (A21-3) | | | | | | | |
| | | | (A21-4) | | | | | | | |
| | | VISCOSITY [Pas] | | 37000 | 13000 | 80 | 800 | 10000 | 80 | 80 |
| | | ALKENYL GROUP CONTENT [mmol/g] | | 0.045 | 0.006 | 0.0045 | 0.003 | 0.0054 | 0.0045 | 0.0495 |
| | | MASS REDUCTION RATE [%] | | 3.1 | 3.25 | 0.53 | — | 3.06 | 0.53 | 1.66 |
| | (B) | (B1) | | 10.5 | 32 | 32 | 16 | 32 | 32 | 32 |
| | | (B2) | | | | | | | | |
| | | (B3) | | | | | | | | |
| | | (Bcf) | | | | | | | | |
| | (C) | (C1) | | 3.4 | 3 | 3 | 3 | 4 | 3 | 3 |
| | | (C2) | | | | | | | | |
| | MASS REDUCTION RATE OF BASE COMPOUND [%] | | | | 0.16 phc | 0.13 phc | 0.1 phc | 0.15 phc | 0.12 phc | 0.125 |
| | (D) | (D11) | | | 8 ppmPt | 8 ppmPt | 8 ppmPt | 8 ppmPt | 8 ppmPt | |
| | | (D22) | | | | | | | | |
| EVALUATION | BASE COMPOUND | ROLL OPERABILITY | | POOR NOT WIND ALONG ROLL | GOOD | POOR NOTICEABLY PLASTICIZED | POOR EXCESSIVE TACKINESS TO ROLL | GOOD | POOR EXCESSIVE TACKINESS TO ROLL | POOR EXCESSIVE TACKINESS TO ROLL |
| | | PLASTICITY NUMBER | | GOOD | 220 | | | 230 | | |
| | | EXTRUSION WORKABILITY OF SILICONE RUBBER COMPOSITION | | | GOOD | | | GOOD | | |
| | CURED PRODUCT | HARDNESS (Type A) | | | 27 | | | 25 | | |
| | | TENSILE STRENGTH [MPa] | | | 10 | | | 8.7 | | |
| | | ELONGATION [%] | | | 1000 | | | 1100 | | |
| | | DENSITY [g/cm³] | | | 1.12 | | | 1.12 | | |
| | | MASS REDUCTION RATE [%] | | | 1.34 | | | 1.31 | | |
| | | LOW MOLECULAR SILOXANE CONTENT [ppm] | | | — | | | — | | |
| | EXTRUDATE | APPEARANCE | | | GLOSSY | | | GLOSSY | | |
| | | NUMBER OF PROTRUSIONS [PIECES/0.01 mm²] | | | | | | | | |
| | | BLOCKING RESISTANCE | | | NO | | | NO | | |

From Tables 2 to 5, it is seen that the silicone rubber compositions of Examples have good moldability, in particular, extrusion moldability, while ensuring that their cured products have sufficient strength. In Examples 9 to 23, the surfaces of the extrudates were excellent in slip property and did not suffer blocking. Examples 1 to 8 are expected to be good in extrusion moldability and also good in blocking resistance because the base compounds are the same as those of Examples 12 and 14 to 20 and the curing agents are the same as those of Examples 9 to 11.

Further, it was confirmed by the observation of the surfaces of the extrudates (cured products) that fine spherical particles were partly exposed to the surfaces to form granular protrusions. Further, from analysis of a constituent ratio of Si atoms, C atoms, and O atoms of the spherical particles, it is thought that the spherical particles are aggregates of silica particles. It is thought that the surface slip property of the extrudates was improved by the presence of the spherical bodies in which the silica particles were aggregated.

When the component (A) is the low viscosity component (A) (Examples 1 to 6, 9, and 12 to 18), it is possible to sufficiently reduce the low molecular siloxane from the raw material component, and the use of the component (A) in which the low molecular siloxane is reduced eliminates a need for the post-curing of the cured product.

The silicone rubber composition of the present invention has good moldability, in particular, extrusion moldability, while ensuring that its cured product has sufficient strength. Further, the use of the low viscosity component (A)-containing silicone rubber composition which is a preferred embodiment of the silicone rubber composition of the present invention enables the advance sufficient reduction of the low molecular siloxane contained in the component (A), which makes it possible to obtain a cured product whose low molecular siloxane content is fully reduced, for example, a silicone rubber molded product whose mass reduction rate in before and after the normal-pressure, 200° C., four-hour heat treatment is 0.5% or less, without performing the post-curing.

Such a silicone rubber molded product is suitable as connector seals, gaskets, packings, cushioning materials or the like for automobiles and electronic equipment because it causes almost no contact fault of electronic equipment caused by the volatile low molecular siloxane. In addition, owing to a sufficiently small amount of the volatile low molecular siloxane therein, it is suitable for medical tubes, catheters, check valves, packings, and wound care products, for health care applications such as baby nipples, and for applications such as kitchen utensils. Furthermore, when used in these applications, composite molding with a wide variety of materials, such as thermally vulnerable materials such as thermoplastic plastic, is possible since it does not require high-temperature post-curing.

Since the surface of the extrudate made from the silicone rubber composition of the present invention is excellent in slip property, it hardly suffers blocking. The silicone rubber composition of the present invention is suitable for the production of extrudates such as packings, tubes, and cables Further, owing to the granular protrusions exposed to the surface, the extrudate can have a surface texture which is matte and free of stickiness, so that it is suitable for applications such as wearable devices and weather strips for automobile.

What is claimed is:

1. A silicone rubber composition comprising:
   (A) a 100 part by mass base polymer consisting of the following (A1) and (A2), with a ratio of the (A1) being 20 to 100% by mass to the whole (A), the base polymer having a viscosity of 5 to 20000 Pas at 25° C. and having an alkenyl group content of 0.001 to 0.3 mmol/g,
   (A1) a polyorganosiloxane diol represented by the following formula (1), whose viscosity at 25° C. is 1 to 100 Pas

$$HO[(R^1_2)SiO]_{n1}[R^1R^2SiO]_{n2}H \quad (1)$$

where in the formula (1), each $R^1$ independently represents a monovalent unsubstituted or substituted hydrocarbon group not containing an alkenyl group, and $R^2$ represents an alkenyl group, and n1 and n2 each represent the total number of randomly polymerized or block-polymerized repeating units, n1 being an integer of 200 to 1200 and n2 being an integer of 0 to 30, and
   (A2) a polyorganosiloxane represented by the following average composition formula (2), whose viscosity at 25° C. is 0.2 to 40000 Pas

$$R^3_a SiO_{(4-a)/2} \quad (2)$$

where in the formula (2), each $R^3$ independently represents a monovalent unsubstituted or substituted, saturated or unsaturated hydrocarbon group not containing a hydroxy group, and "a" represents a number in a range of 1.98 to 2.02;
   (B) a 10 to 50 part by mass silica powder whose specific surface area is 50 to 400 m$^2$/g;
   (C) a 1 to 10 part by mass organosilazane; and
   (D) a catalytic amount of a peroxide compound as a curing agent.

2. The silicone rubber composition according to claim 1, wherein the ratio of the component (A1) to the whole component (A) is 50 to 100% by mass, and the viscosity of the component (A) at 25° C. is 5 to 3000 Pas.

3. The silicone rubber composition according to claim 1, wherein the ratio of the component (A1) to the whole component (A) is 40 to 100% by mass, and the viscosity of the component (A) at 25° C. is 5 to 1000 Pas.

4. The silicone rubber composition according to claim 1, wherein a mass reduction rate of the component (A), measured as a percentage of mass lost during heat treatment under ambient pressure at 200° C. for four-hours, is 1.0% or less, and the silicone rubber composition gives a cured product that has a mass reduction rate of 0.5% or less, measured as a percentage of mass lost during heat treatment under ambient pressure at 200° C. for four-hours, without being post-cured.

5. The silicone rubber composition according to claim 1, wherein the component (A2) is an alkenyl group-containing linear polyorganosiloxane whose alkenyl group content is 0.001 to 0.3 mmol/g.

6. The silicone rubber composition according to claim 1, wherein the component (D) is an organic peroxide, and has a content of 0.01 to 5 parts by mass to 100 parts by mass of the component (A).

7. The silicone rubber composition according to claim 1, wherein a tubular cured product obtained when the silicone rubber composition is extruded at a 2 m/minute rate by a screw extruder and thereafter is cured has, on a surface, 1 to 300 pieces/0.01 mm$^2$ granular protrusions whose maximum diameter measured in a scanning electron microscopic image is 0.1 to 30 μm.

8. A method of producing the silicone rubber composition according to claim 1, the method comprising: adding the component (B) and the component (C) to the component (A)

in parts a plurality of times or continuously at a predetermined rate; and thereafter adding the component (D).

9. The production method according to claim 8, comprising a step of heating a mixture of the component (A), the component (B), and the component (C) at 100 to 200° C. before adding the component (D).

10. A method of producing a silicone rubber molded product, the method comprising
molding the silicone rubber composition according to claim 3,
curing the molded silicone rubber composition by heat or UV irradiation, and
obtaining a silicone rubber molded product whose mass reduction rate, measured as a percentage of mass lost during heat treatment under ambient pressure at 200° C. for four-hours, is 0.5% or less, without performing post-curing.

11. A silicone rubber extrudate obtained using the silicone rubber composition according to claim 1, the silicone rubber extrudate having, on a surface, granular protrusions whose maximum diameter measured in a scanning electron microscopic image is 0.1 to 30 μm.

12. A silicone rubber composition comprising:
(A) a 100 part by mass base polymer consisting of the following (A1) and (A2), with a ratio of the (A1) being 20 to 100% by mass to the whole (A), the base polymer having a viscosity of 5 to 20000 Pas at 25° C. and having an alkenyl group content of 0.001 to 0.3 mmol/g,
(A1) a polyorganosiloxane diol represented by the following formula (1), whose viscosity at 25° C. is 1 to 100 Pas

$$HO[(R^1_2)SiO]_{n1}[R^1R^2SiO]_{n2}H \qquad (1)$$

where in the formula (1), each $R^1$ independently represents a monovalent unsubstituted or substituted hydrocarbon group not containing an alkenyl group, and $R^2$ represents an alkenyl group, and n1 and n2 each represent the total number of randomly polymerized or block-polymerized repeating units, n1 being an integer of 200 to 1200 and n2 being an integer of 0 to 30, and
(A2) a polyorganosiloxane represented by the following average composition formula (2), whose viscosity at 25° C. is 0.2 to 40000 Pas

$$R^3_aSiO_{(4-a)/2} \qquad (2)$$

where in the formula (2), each $R^3$ independently represents a monovalent unsubstituted or substituted, saturated or unsaturated hydrocarbon group not containing a hydroxy group, and "a" represents a number in a range of 1.98 to 2.02;
(B) a 10 to 50 part by mass silica powder whose specific surface area is 50 to 400 m²/g;
(C) a 1 to 10 part by mass organosilazane; and
(D) an amount large enough to crosslink the base polymer of an addition crosslinkage agent and a catalytic amount of an addition reaction catalyst, as a curing agent.

13. The silicone rubber composition according to claim 12, wherein the ratio of the component (A1) to the whole component (A) is 50 to 100% by mass, and the viscosity of the component (A) at 25° C. is 5 to 3000 Pas.

14. The silicone rubber composition according to claim 12, wherein the ratio of the component (A1) to the whole component (A) is 40 to 100% by mass, and the viscosity of the component (A) at 25° C. is 5 to 1000 Pas.

15. The silicone rubber composition according to claim 12, wherein a mass reduction rate of the component (A), measured as a percentage of mass lost during heat treatment under ambient pressure at 200° C. for four hours, is 1.0% or less, and the silicone rubber composition gives a cured product that has a mass reduction, measured as a percentage of mass lost during heat treatment under ambient pressure at 200° C. for four hours, of 0.5% or less, without being post-cured.

16. The silicone rubber composition according to claim 12, wherein the component (A2) is an alkenyl group-containing linear polyorganosiloxane whose alkenyl group content is 0.001 to 0.3 mmol/g.

17. The silicone rubber composition according to claim 12, wherein the component (D) consists of a polyorganohydrogensiloxane (D21) and an addition reaction catalyst (D22), the polyorganohydrogensiloxane (D21) having a siloxane skeleton in which hydrogen atoms and organic groups are bonded with silicon atoms, and having two or more of the hydrogen atoms in a molecule on average, and a content of the polyorganohydrogensiloxane (D21) is an amount such that a molar ratio of the hydrogen atoms bonded with the silicon atoms of the polyorganohydrogensiloxane (D21) to the alkenyl group of the component (A) is 0.01 to 10, and a content of the addition reaction catalyst (D22) is an amount with which an addition reaction of the component (A) and the component (D21) is catalyzed.

18. The silicone rubber composition according to claim 17, wherein the addition reaction catalyst (D22) contains at least one selected from a group consisting of platinum, rhodium, palladium, iridium, and nickel.

19. The silicone rubber composition according to claim 12, wherein a tubular cured product obtained when the silicone rubber composition is extruded at a 2 m/minute rate by a screw extruder and thereafter is cured has, on a surface, 1 to 300 pieces/0.01 mm² granular protrusions whose maximum diameter measured in a scanning electron microscopic image is 0.1 to 30 μm.

20. A method of producing the silicone rubber composition according to claim 12, the method comprising: adding the component (B) and the component (C) to the component (A) in parts a plurality of times or continuously at a predetermined rate; and thereafter adding the component (D).

21. The production method according to claim 20, comprising a step of heating a mixture of the component (A), the component (B), and the component (C) at 100 to 200° C. before adding the component (D).

22. A method of producing a silicone rubber molded product, the method comprising molding the silicone rubber composition according to claim 14, curing the molded silicone rubber composition by heat or UV irradiation, and obtaining a silicone rubber molded product whose mass reduction rate, measured as a percentage of mass lost during heat treatment under ambient pressure at 200° C. for four hours, is 0.5% or less, without performing post-curing.

23. A silicone rubber extrudate obtained using the silicone rubber composition according to claim 12, the silicone rubber extrudate having, on a surface, granular protrusions whose maximum diameter measured in a scanning electron microscopic image is 0.1 to 30 μm.

\* \* \* \* \*